(12) United States Patent
Park

(10) Patent No.: US 12,321,632 B2
(45) Date of Patent: Jun. 3, 2025

(54) IMAGE PROCESSING APPARATUS INCLUDING LINE BUFFER AND OPERATION METHOD THEREOF

(71) Applicant: Magnachip Mixed-Signal, Ltd., Cheongju-si (KR)

(72) Inventor: Sangsu Park, Cheongju-si (KR)

(73) Assignee: Magnachip Mixed-Signal, Ltd., Cheongju-si (KR)

( * ) Notice: Subject to any disclaimer, the term of this patent is extended or adjusted under 35 U.S.C. 154(b) by 253 days.

(21) Appl. No.: 18/096,245

(22) Filed: Jan. 12, 2023

(65) Prior Publication Data
US 2024/0053918 A1    Feb. 15, 2024

(30) Foreign Application Priority Data
Aug. 12, 2022   (KR) .................. 10-2022-0101322

(51) Int. Cl.
*G06F 5/06*    (2006.01)
*G06F 3/06*    (2006.01)

(52) U.S. Cl.
CPC .......... *G06F 3/0656* (2013.01); *G06F 3/0604* (2013.01); *G06F 3/0673* (2013.01)

(58) Field of Classification Search
CPC ...... G06F 3/0656; G06F 3/065; G06F 3/0641; G06F 3/064; G06F 3/0653; G06F 3/0604; G06F 3/0646; G06F 3/0673; G06F 5/06; G06F 5/65; G06F 5/08; G06T 1/60
See application file for complete search history.

(56) References Cited

U.S. PATENT DOCUMENTS

2018/0011800 A1*   1/2018   Deb .................. G06F 1/3275

\* cited by examiner

*Primary Examiner* — Hau H Nguyen
(74) *Attorney, Agent, or Firm* — NSIP Law

(57) ABSTRACT

An image processing apparatus includes: a line buffer configured to store image data; a clock gating circuit configured to apply a clock signal to the line buffer; and a data processor configured to determine, when performing a write operation, whether to skip the write operation to the line buffer for each of adjacent data according to whether a value of each of the adjacent data within an image is the same, wherein the data processor is further configured to control the clock gating circuit, such that the clock signal is prevented from being applied to the line buffer while the write operation is skipped and the clock signal is applied to the line buffer while the write operation is performed.

15 Claims, 17 Drawing Sheets

FIG. 7

| | LB Address | LB Data | Scoreboard Status | | LB Write/Read OP |
|---|---|---|---|---|---|
| 701 | 0 | A | Status[0] | 1 (Fixed) | Access |
| | 1 | A | Status[1] | 0 | Skip |
| 703 | 2 | B | Status[2] | 1 | Access |
| | 3 | B | Status[3] | 0 | Skip |
| | 4 | B | Status[4] | 0 | Skip |
| 705 | 5 | C | Status[5] | 1 | Access |
| | 6 | C | Status[6] | 0 | Skip |
| 707 | 7 | D | Status[7] | 1 | Access |
| | 8 | D | Status[8] | 0 | Skip |
| 709 | 9 | E | Status[9] | 1 | Access |

FIG. 8

| | LB Address | LB Data | Scoreboard Status | | LB Write/Read OP |
|---|---|---|---|---|---|
| 801 | 0 | A | Status[0] | 1 (Fixed) | Access |
| | 1 | A | Status[1] | 0 | Skip |
| | 2 | A | Status[2] | 0 | Skip |
| | 3 | A | Status[3] | 0 | Skip |
| | 4 | A | Status[4] | 0 | Skip |
| 803 | 5 | A | Status[5] | 0 | Skip |
| | 6 | A | Status[6] | 0 | Skip |
| | 7 | A | Status[7] | 0 | Skip |
| | 8 | A | Status[8] | 0 | Skip |
| | 9 | A | Status[9] | 0 | Skip |

IMAGE PROCESSING APPARATUS INCLUDING LINE BUFFER AND OPERATION METHOD THEREOF

CROSS-REFERENCE TO RELATED APPLICATIONS

The present application claims the benefit under 35 U.S.C. 119(a) of Korean Patent Application No. 10-2022-0101322, filed Aug. 12, 2022, the entire disclosure of which is incorporated herein by reference for all purposes.

BACKGROUND

1. Field

The following disclosure relates to an image processing apparatus including a line buffer and an operation method thereof.

2. Description of the Related Art

Recently, since there is an increasing need for image data processing and compression, an image processing apparatus including a line buffer such as a static random-access memory (SRAM) or first input first output (FIFO) is gradually increasing. The image processing apparatus using the line buffer can write image data to the line buffer or read image data stored in the line buffer by using a sequential access method of sequentially accessing the line buffer in the order of address.

Meanwhile, a conventional image processing apparatus including a line buffer uses a clock gating scheme in which a clock signal is to be applied to the line buffer only when data is written or read in order to reduce power consumption due to the line buffer. However, there is a limit to reducing power consumption of the image processing apparatus using only the clock gating method. Therefore, it is necessary to provide another method for reducing power consumption of the image processing apparatus including a line buffer.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image processing apparatus including: a line buffer configured to store image data; a clock gating circuit configured to apply a clock signal to the line buffer; and a data processor configured to determine, when performing a write operation, whether to skip the write operation to the line buffer for each of adjacent data according to whether a value of each of the adjacent data within an image is the same, wherein the data processor is further configured to control the clock gating circuit, such that the clock signal is prevented from being applied to the line buffer while the write operation is skipped and the clock signal is applied to the line buffer while the write operation is performed.

When the value of each of the adjacent data is the same, the data processor may be configured to determine to: perform the write operation to the line buffer for data of a first address among the adjacent data having the same value, and skip the write operation to the line buffer for data of an address after the first address among the adjacent data having the same value.

The data processor may include a state information storage configured to store state information indicating whether the write operation of the data of each of the addresses is skipped.

The data processor may be configured to determine, when performing a read operation, whether to skip the read operation from each address, according to the state information of the data of each address. The data processor may be configured to control the clock gating circuit such that the clock signal is prevented from being applied to the line buffer while the read operation is skipped and the clock signal is applied to the line buffer while the read operation is performed.

The data processor may be configured to: determine to skip the read operation from the corresponding address, when the state information indicates that the write operation of data of a corresponding address is skipped. The data processor may be configured to determine to perform the read operation from the corresponding address, when the state information indicates that the write operation of data of a corresponding address is performed.

The state information storage may include a scoreboard having the same number of bits as a number of addresses in the line buffer. State information on the data of each address may be stored in each bit of the scoreboard.

The image processing apparatus may further include a scoreboard enable controller configured to control an enable state of the scoreboard, according to a number of occurrences of adjacent identical data within a range of a specified unit.

In a state where the scoreboard is enabled, the scoreboard enable controller may be configured to count a case where the number of occurrences of the adjacent identical data is less than a required minimum number of the adjacent identical data. When the counted value is less than a specified first number of acceptable thresholds, the scoreboard enable controller may be configured to maintain the enable state of the scoreboard. When the counted value is greater than or equal to the specified first number of acceptable thresholds, the scoreboard enable controller may be configured to disable the scoreboard.

In a state where the scoreboard is disabled, the scoreboard enable controller may be configured to count a case where the number of occurrences of the adjacent identical data is greater than or equal to a required minimum number of the adjacent identical data. When the counted value is less than a specified second number of acceptable thresholds, the scoreboard enable controller may be configured to maintain the disable state of the scoreboard. When the counted value is greater than or equal to the specified second number of acceptable thresholds, the scoreboard enable controller may be configured to enable the scoreboard again.

During processing a first image frame, the scoreboard enable controller may be configured to count a case where the number of occurrences of the adjacent identical data is less than a required minimum number of the adjacent identical data. When a value obtained by counting during processing the first image frame is less than a specified third number of acceptable thresholds, the scoreboard enable controller may be configured to enable the scoreboard during processing a second image frame. When the value obtained by counting is greater than or equal to the specified third number of acceptable thresholds, the scoreboard enable controller may be configured to disable the scoreboard during processing the second image frame.

When the counted value is greater than or equal to the specified first number of acceptable thresholds, the scoreboard enable controller may be configured to disable the data processor including the scoreboard. When a next image frame begins to be processed, the scoreboard enable controller may be configured to enable the data processor.

In another general aspect, an operation method of an image processing apparatus including a line buffer and a data processor. The operation method may include: determining, by the data processor, whether a value of each of adjacent data within an image is the same, when performing a write operation; determining, by the data processor, whether to skip the write operation to the line buffer for each of the adjacent data, according to whether the value of each of the adjacent data is the same; and controlling, by the data processor, a clock gating circuit configured to apply a clock signal to the line buffer, according to the determination of whether to skip the write operation.

When the value of each of the adjacent data is the same value, the determining of whether to skip the write operation to the line buffer may include: determining to perform the write operation to the line buffer for data of a first address among the adjacent data having the same value; and determining to skip the write operation to the line buffer for data of an address after the first address among the adjacent data having the same value.

The operation method may further include storing state information indicating whether the write operation for the data of each address is skipped.

The operation method may further include: determining, when performing a read operation, whether to skip the read operation from each address, according to the state information of the data of each address; and controlling the clock gating circuit configured to apply the clock signal to the line buffer, according to the determination of whether to skip the read operation.

The determining of whether to skip the read operation from each address may include: determining to skip the read operation from a corresponding address when the state information indicates that the write operation for data of the corresponding address is skipped; and determining to perform the read operation from a corresponding address when the state information indicates that the write operation for data of the corresponding address is performed.

The state information about data at each address may be stored in a scoreboard having the same bits as a number of addresses in the line buffer.

The operation method may further include controlling an enable state of the scoreboard, according to a number of occurrences of adjacent identical data within a range of a specified unit.

The controlling of the enable state of the scoreboard may include: counting a case where the number of occurrences of the adjacent identical data is less than a required minimum number of the adjacent identical data, in a state where the scoreboard is enabled; maintaining the enable state of the scoreboard, when the counted value is less than a specified first number of acceptable thresholds; and disabling the scoreboard, when the counted value is greater than or equal to the specified first number of acceptable thresholds.

The controlling of the enable state of the scoreboard may include: counting a case where the number of occurrences of the adjacent identical data is greater than or equal to a required minimum number of the adjacent identical data, in a state where the scoreboard is disabled; maintaining the disable state of the scoreboard, when the counted value is less than a specified second number of acceptable thresholds; and enabling the scoreboard again, when the counted value is greater than or equal to the specified second number of acceptable thresholds.

The disabling of the scoreboard may include disabling the data processor including the scoreboard. The data processor may be configured to be enabled when a next image frame begins to be processed.

The controlling of the enable state of the scoreboard may include: counting a case where the number of occurrences of the adjacent identical data is less than a required minimum number of the adjacent identical data, during processing a first image frame; enabling the scoreboard during processing a second image frame, when a value obtained by counting during processing the first image frame is less than a specified third number of acceptable thresholds; and disabling the scoreboard during processing the second image frame, when the value obtained by counting is greater than or equal to the specified third number of acceptable thresholds.

Other features and aspects will be apparent from the following detailed description, the drawings and the claims.

BRIEF DESCRIPTION OF THE DRAWINGS

FIGS. 7 and 8 illustrate example diagrams showing that the number of times the read/write operation is skipped according to image data by the image processing apparatus according to one or more embodiments of the present disclosure;

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
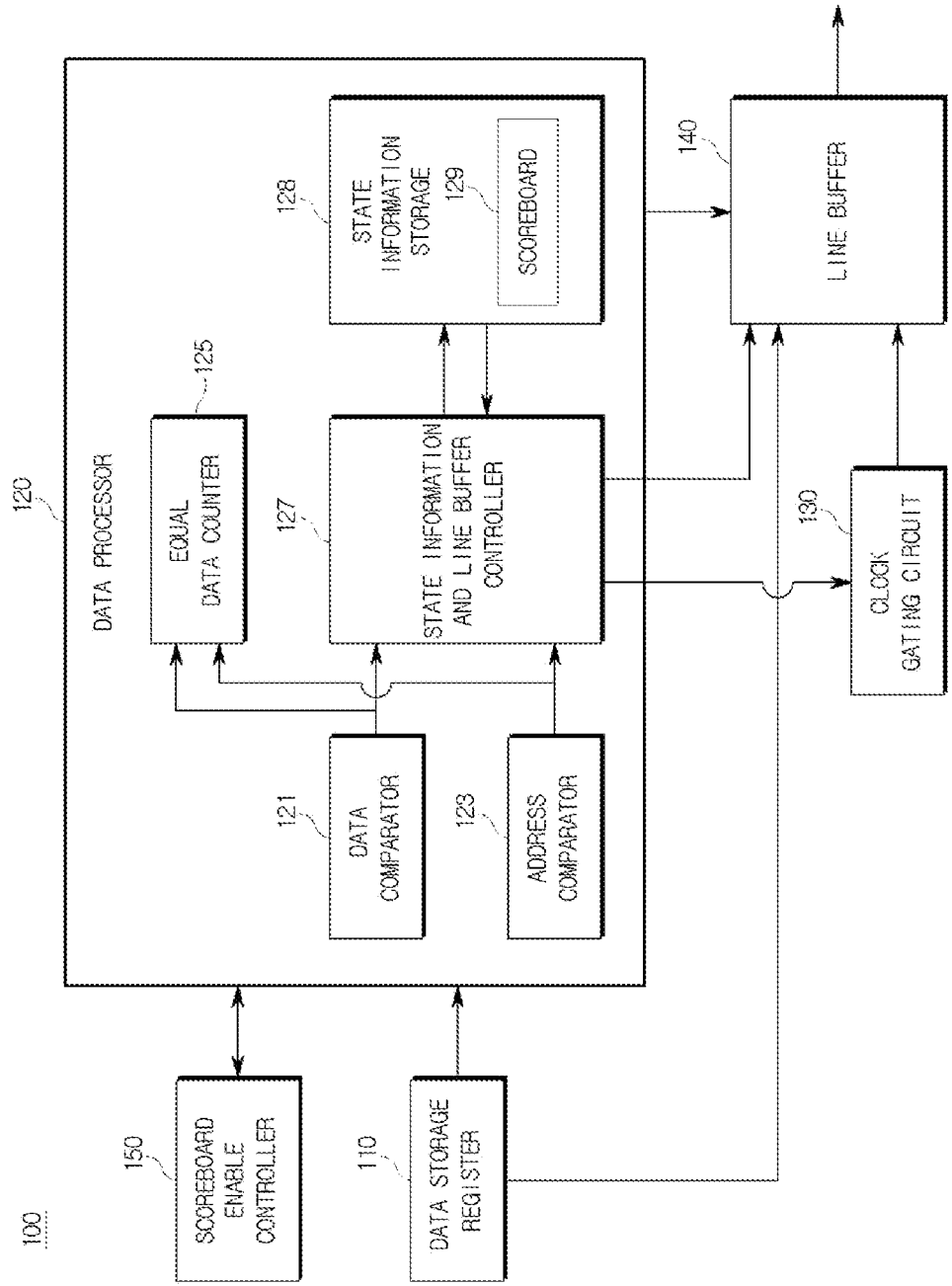
FIG. 1 illustrates a block diagram of an example of an image processing apparatus including a line buffer according to one or more embodiments of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. In an example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

What one component is referred to as being "connected to" or "coupled to" another component includes both a case where one component is directly connected or coupled to another component and a case where a further another component is interposed between them. Meanwhile, what one component is referred to as being "directly connected to" or "directly coupled to" another component indicates that a further another component is not interposed between them. The term "and/or" includes each of the mentioned items and one or more all of combinations thereof.

Terms used in the present specification are provided for description of only specific embodiments of the present disclosure, and not intended to be limiting. In the present specification, an expression of a singular form includes the expression of plural form thereof if not specifically stated. The terms "comprises" and/or "comprising" used in the specification is intended to specify characteristics, numbers, steps, operations, components, parts or any combination thereof which are mentioned in the specification, and intended not to exclude the existence or addition of at least one another characteristics, numbers, steps, operations, components, parts or any combination thereof.

While terms such as the first and the second, etc., can be used to describe various components, the components are not limited by the terms mentioned above. The terms are used only for distinguishing between one component and other components.

Therefore, the first component to be described below may be the second component within the spirit of the present disclosure. Unless differently defined, all terms used herein including technical and scientific terms have the same meaning as commonly understood by one of ordinary skill in the art to which the present disclosure belongs. Also, commonly used terms defined in the dictionary should not be ideally or excessively construed as long as the terms are not clearly and specifically defined in the present application.

A term "part" or "module" used in the embodiments may mean software components or hardware components such as a field programmable gate array (FPGA), an application specific integrated circuit (ASIC). The "part" or "module" performs certain functions. However, the "part" or "module" is not meant to be limited to software or hardware. The "part" or "module" may be configured to be placed in an addressable storage medium or to restore one or more processors. Thus, for one example, the "part" or "module" may include components such as software components, object-oriented software components, class components, and task components, and may include processes, functions, attributes, procedures, subroutines, segments of a program code, drivers, firmware, microcode, circuits, data, databases, data structures, tables, arrays, and variables. Components and functions provided in the "part" or "module" may be combined with a smaller number of components and "parts" or "modules" or may be further divided into additional components and "parts" or "modules".

Methods or algorithm steps described relative to some embodiments of the present disclosure may be directly implemented by hardware and software modules that are executed by a processor or may be directly implemented by a combination thereof. The software module may be resident on a RAM, a flash memory, a ROM, an EPROM, an EEPROM, a resistor, a hard disk, a removable disk, a CD-ROM, or any other type of record medium known to those skilled in the art. An exemplary record medium is coupled to a processor and the processor can read information from the record medium and can record the information in a storage medium. In another way, the record medium may be integrally formed with the processor. The processor and the record medium may be resident within an application specific integrated circuit (ASIC).

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 illustrates a block diagram of an image processing apparatus including a line buffer according to one or more embodiments of the present disclosure. The configuration of the image processing apparatus shown in FIG. 1 is an exemplary embodiment of the present disclosure. In an example, some of the components shown in FIG. 1 may be omitted or components not shown may be added. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

Referring to FIG. 1, an image processing apparatus 100 may include a data storage register 110, a data processor 120, a clock gating circuit 130, a line buffer 140, and a scoreboard enable controller 150.

According to one or more embodiments, when performing a write operation, the data storage register 110 may distinguish write data for each address that is input based on the address as even-numbered write data and odd-numbered write data and output them. In an example, among n number of addresses, the data storage register 110 may distinguish write data of an even-numbered address (e.g., addr [0], addr [2], addr [4], . . . , and addr [2n]) as even-numbered write data and write data of odd-numbered addresses (e.g., addr [1], addr [3], addr [5], . . . , and addr [2n+1]) as odd-numbered write data, and may output them.

In an example, the data processor 120 may perform an operation required to skip write and/or read operations on the same data. The data processor 120 may determine, when performing a write operation, whether to skip the write operation to the line buffer for each of adjacent data according to whether a value of each of the adjacent data within an image is the same. Further, the data processor 120 may control the clock gating circuit, such that the clock signal is prevented from being applied to the line buffer while the write operation is skipped and the clock signal is applied to the line buffer while the write operation is performed, as described below.

In an example, when performing a write operation, the data processor 120 may alternately receive even-numbered write data and odd-numbered write data from the data storage register 110, may compare the received even-numbered write data and odd-numbered write data, and may determine whether adjacent input write data are the identical. The adjacent input write data may be sequentially input according to the order of addresses. When adjacent write data are identical, the data processor 120 may cause a write operation to an address of a first write data among the identical data to be performed and may cause a write operation to addresses of the other write data to be skipped. In an example, the data processor 120 may store state information of each address. In an example, the state information of an address to which the write operation is to be performed may be stored as "1", and the state information of an address where the write operation is to be skipped may be stored as "0". In an example, the state information "1" may mean that the write data of the corresponding address is different from the write data of the previous address, (that is to say, updated data), and the state information "0" may mean that the write data of the corresponding address is identical to the write data of the previous address (that is to say, data not updated). In an example, the state information may indicate whether the write operation of the data to the corresponding address is skipped (or performed). In an example, the state information "1" may indicate that the write operation of the data to the corresponding address is performed, and the state information "0" may indicate that the write operation of the data to the corresponding address is skipped. Hereinafter, in the present disclosure, when adjacent write data are identical, the adjacent write data may be referred to as identical data or adjacent identical data, and when adjacent write data are not identical, the adjacent data may be referred to as non-identical data or non-adjacent identical data.

In an example, when performing a read operation, the data processor 120 may determine whether to perform or skip the read operation from the corresponding address according to the state information for each address. In an example, the data processor 120 may perform a read operation from an address having status information of "1" and may skip a read operation from an address having state information of "0".

In an example, the data processor 120 may include a data comparator 121, an address comparator 123, an equal data counter 125, a state information and line buffer controller 127, and a state information storage 128.

When performing a write operation, the data comparator 121 may compare a current write data that is input from the data storage register 110 with a previous write data, and may output a result from the comparison. In an example, when the current write data is even-numbered, the previous write data may be odd-numbered, and when the current write data is odd-numbered, the previous write data may be even-numbered.

In an example, when performing a write operation, the address comparator 123 may compare an address corresponding to the current write data with a specified reference value, and may output a result from the comparison. The specified reference value may be 0 indicating a 0th address. In an example, the address comparator 123 may output a comparison result value indicating whether the address corresponding to the current write data is the 0th address. This ensures that the write operation to the 0th address is always performed because there is no previous write data for the write data of the 0th address.

In an example, when performing a write operation, the equal data counter 125 may count how many times adjacent identical data is generated within a range corresponding to a specified unit (e.g., line, block, and frame), according to data input from the data comparator 121 and the address comparator 123. That is, the equal data counter 125 may count the number of occurrences the adjacent identical data is generated for each line, block, or frame unit.

In an example, when performing a write operation, the state information and line buffer controller 127 may determine whether to perform (or skip) the write operation to each address, and may generate state information of each address. In an example, as a result of the comparison of the data comparator 121 and/or the address comparator 123, if the current write data is a write data of the 0th address or the current write data is different from the previous write data, the state information and line buffer controller 127 may determine that the write operation to the address of the current write data may be performed. Here, the state information and line buffer controller 127 may generate the state information of the address of the current write data as "1". For another example, as a result of the comparison of the data comparator 121 and/or the address comparator 123, if the current write data is not the write data of the 0th address and the current write data is the same as the previous write data, the state information and line buffer controller 127 may determine that the write operation to the address of the current write data may be skipped. Here, the state information and line buffer controller 127 may generate the state information of the address of the current write data as "0".

In an example, when performing the write operation, the state information and line buffer controller 127 may control the clock gating circuit 130 and the line buffer 140 according to whether the write operation determined for each address is performed. In an example, if it is determined that the write operation to the address of the current write data may be performed, the state information and line buffer controller 127 may control the clock gating circuit 130 and the line buffer 140 such that the line buffer 140 is enabled. For another example, if it is determined that the write operation to the address of the current write data is skipped, the state information and line buffer controller 127 may control the clock gating circuit 130 and the line buffer 140 such that the line buffer 140 is disabled.

In an example, when performing the write operation, the state information and line buffer controller 127 may provide the state information of each address to the state information storage 128. The state information storage 128 may store state information indicating whether the write operation of the data of each address is skipped.

According to one or more embodiments, when performing a read operation, the state information and line buffer controller 127 may receive the state information of each address from the state information storage 128, and may control the clock gating circuit 130 and the line buffer 140. In an example, when the state information of the first address is "1", the state information and line buffer controller 127 may determine that the read operation may be performed, and may control the clock gating circuit 130 and the line buffer 140 such that the line buffer 140 is enabled. For another example, when the state information of the first address is "0", the state information and line buffer controller 127 may determine that the read operation may be skipped, and may control the clock gating circuit 130 and the line buffer 140 such that the line buffer 140 is disabled.

In an example, when performing a write operation, the state information storage 128 may store state information of each address provided from the state information and line buffer controller 127. Meanwhile, when performing a read operation, the state information storage 128 may provide the state information of each address to the state information and the line buffer controller 127. In an example, the state information storage 128 may include a scoreboard 129 with as many bits as the depth of the line buffer 140. The depth of the line buffer 140 may mean the number of addresses in the line buffer 140. One bit of the scoreboard 129 may store the state information of one address. Accordingly, the scoreboard 129 may have the same number of bits as a number of addresses in the line buffer, and state information on the data of each address may be stored in each bit of the scoreboard.

In an example, the clock gating circuit 130 may apply a clock signal to the line buffer 140 according to the control of the state information and line buffer controller 127.

According to one or more embodiments, during the write operation, when receiving, from the state information and line buffer controller 127, a signal indicating that the write operation to the address of the current write data may be performed, the clock gating circuit 130 may apply the clock signal to the line buffer 140. When receiving, from the state information and line buffer controller 127, a signal indicating that the write operation to the address of the current write data may be skipped, the clock gating circuit 130 may control such that the clock signal is not applied to the line buffer 140.

In an example, during the read operation, when receiving, from the state information and line buffer controller 127, a signal indicating that a read operation from a current address may be performed, the clock gating circuit 130 may apply the clock signal to the line buffer 140. When receiving, from the state information and line buffer controller 127, a signal indicating that the read operation from the current address may be skipped, the clock gating circuit 130 may control such that the clock signal is not applied to the line buffer 140.

In an example, when enabled by the state information and line buffer controller 127 and the clock gating circuit 130, the line buffer 140 may store, in the current address, the current write data input from the data storage register 110 or may output the data stored in the current address. In an example, during the write operation, the line buffer 140 may receive a chip enable signal "cen" which indicates chip enable by the state information and line buffer controller 127, and when a clock signal "clk" is applied from the clock gating circuit 130, the line buffer 140 may store, in the current address, the current write data input from the data storage register 110. For another example, during a read operation, the line buffer 140 may receive the chip enable signal "cen" which indicates chip enable by the state information and line buffer controller 127, and when the clock signal is applied from the clock gating circuit 130, the line buffer 140 may output the data stored in the current address.

In an example, the scoreboard enable controller 150 may control the enable state of the scoreboard 129 according to how many occurrences the adjacent identical data is generated within a range of a specified unit (e.g., line unit, block unit, or frame unit). The scoreboard enable controller 150 may control the enable state of the scoreboard 129 according to a number of occurrences of adjacent identical data within a range of a specified unit, thereby enabling or disabling a function of skipping write and/or read operations to/from adjacent identical data. This is because power consumption caused by generating and storing the state information may be greater than power consumption that can be saved by skipping data write and/or read operations, when there is no adjacent identical data within the image data to be processed or when there is a very small amount of adjacent identical data. Accordingly, the scoreboard enable controller 150 according to one or more embodiments of the present disclosure may control the write and/or read operations to be performed or skipped according to how many occurrences adjacent identical data within the data to be processed is generated.

In an example, the scoreboard enable controller 150 may enable the scoreboard 129 at the start of an image frame, and may check the number of occurrences of the adjacent identical data among data within a range corresponding to a specified unit. The scoreboard enable controller 150 may compare the number of occurrences of the adjacent identical data with a required minimum number of adjacent identical data.

In an example, in a state where the scoreboard is enabled, the scoreboard enable controller 150 may count a case where the number of occurrences of the adjacent identical data is less than the required minimum number of adjacent identical data, and may compare the counted value with a first number of acceptable thresholds. While the counted value is less than the first number of acceptable thresholds, the scoreboard enable controller 150 may maintain the enable state of the scoreboard 129. When the counted value reaches the first number of acceptable thresholds, the scoreboard enable controller 150 may disable the scoreboard 129.

In an example, in a state where the scoreboard is disabled, the scoreboard enable controller 150 may count a case where the number of occurrences of the adjacent identical data is greater than or equal to the required minimum number of adjacent identical data, and may compare the counted value with a second number of acceptable thresholds. While the counted value is less than the second number of acceptable thresholds, the scoreboard enable controller 150 may maintain the disable state of the scoreboard 129. When the counted value reaches the second number of acceptable thresholds, the scoreboard enable controller 150 may enable the scoreboard 129 again.

In an example, the scoreboard enable controller 150 may control whether to enable the scoreboard during processing the next image frame, according to a counted value for a previous image frame.

Figure 2:
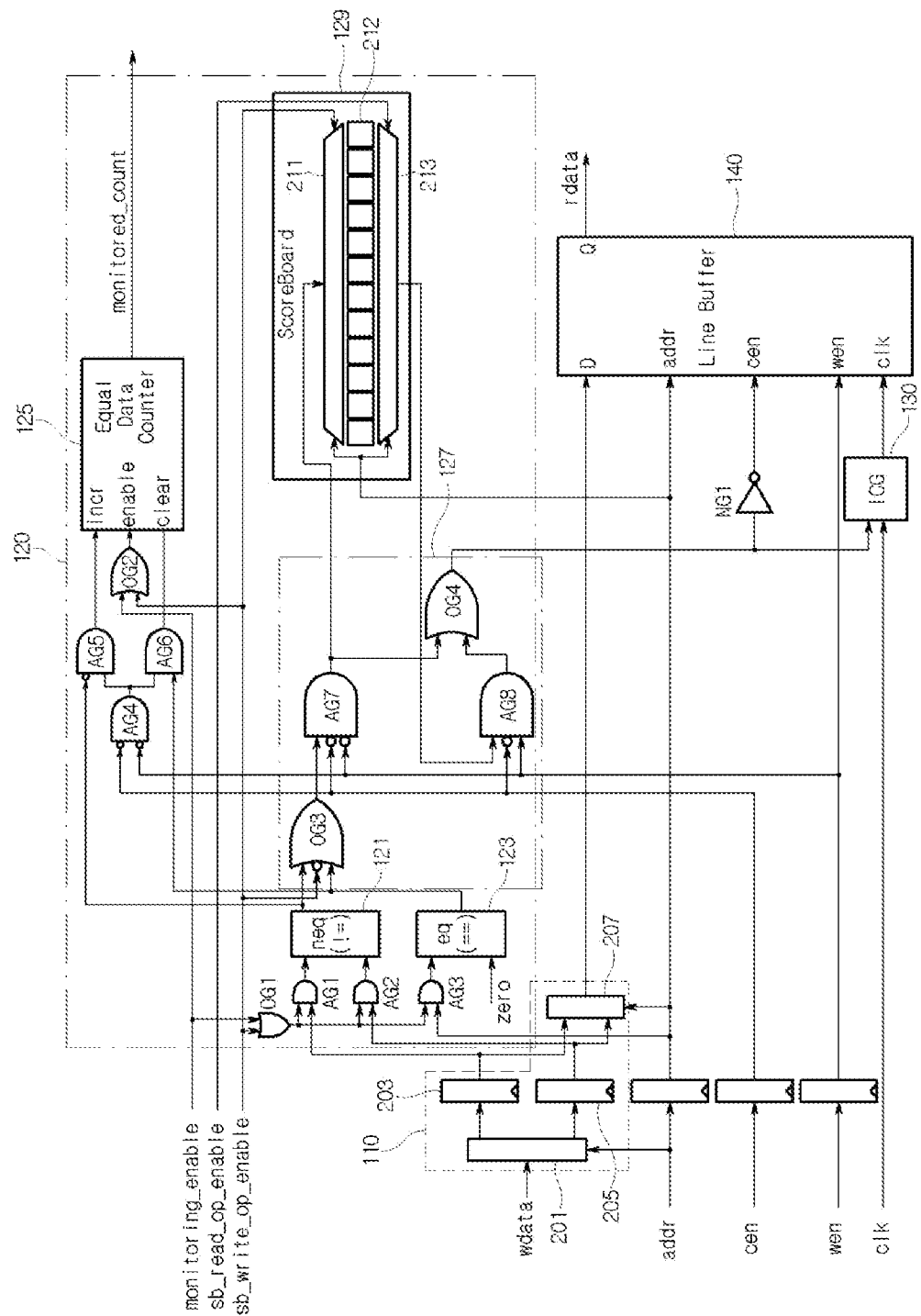
FIG. 2 illustrates a circuit diagram of an example of the image processing apparatus including the line buffer according to one or more embodiments of the present disclosure.

FIG. 2 illustrates a circuit diagram of the image processing apparatus including the line buffer according to one or more embodiments of the present disclosure. FIG. 2 illustrates a detailed circuit diagram of the image processing apparatus 100 of FIG. 1, and the scoreboard enable controller 150 of FIG. 1 is omitted for convenience of description. The scoreboard enable controller 150 of FIG. 1 will be described in more detail with reference to FIG. 9 to be described later. In FIG. 2, the state information storage 128 of FIG. 1 may be referred to as the scoreboard 129. Accordingly, in the present disclosure, the enable of the scoreboard 129 may mean that the state information storage 128 is enabled, and the disable of the scoreboard 129 may mean that the state information storage 128 is disabled.

Referring to FIG. 2, the image processing apparatus 100 may include the data storage register 110, the data processor 120, the clock gating circuit 130, and the line buffer 140.

In an example, the data storage register 110 may include a first demultiplexer 201, an even address data register 203, an odd address data register 205, and a first multiplexer 207.

In an example, when performing a write operation, the first demultiplexer 201 may receive write data and an address corresponding to the write data. When an input address is an even-numbered address, the first demultiplexer 201 may output the input write data to the even address data register 203 and when the input address is an odd-numbered address, the first demultiplexer 201 may output the input write data to the odd address data register 205.

In an example, each of the even address data register 203 and the odd address data register 205 may output the write data input from the first demultiplexer 201 to the data comparator 121 and the first multiplexer 207.

In an example, the first multiplexer 207 may output, to the line buffer 140, the write data alternately input from each of the even address data register 203 and the odd address data register 205.

In an example, the data processor 120 may include the data comparator 121, the address comparator 123, the equal data counter 125, the state information and line buffer controller 127, and the scoreboard 129, which are shown in FIG. 1. Additionally, the data processor 120 may include a first OR gate OG1, a first AND gate AG1, a second AND gate AG2, a third AND gate AG3, a fourth AND gate AG4, and a fifth AND gate AG5, a sixth AND gate AG6, and a second OR gate OG2.

In an example, the first OR gate OG1 may perform an OR operation on a scoreboard write operation enable signal "sb_write_op_enable" and a monitoring enable signal "monitoring_enable", and may output the result to the first AND gate AG1, the second AND gate AG2, and the third AND gate AG3. The scoreboard write operation enable signal "sb_write_op_enable" may enable the scoreboard 129 such that a state information storage operation for each address during the write operation can be performed. In an example, the scoreboard write operation enable signal "sb_write_op_enable" may enable a function of skip the write operation to adjacent identical data during the write operation. The monitoring enable signal "monitoring_enable" may enable the equal data counter 125 in order to monitor the number of occurrences of the adjacent identical data, regardless of whether the skip function is enabled (or whether the scoreboard is enabled).

In an example, the first AND gate AG1 may perform an AND operation on even-numbered write data output from the even address data register 203 and a signal output from the first OR gate OG1, and may provide the result to a first input terminal of the data comparator 121. In an example, when a high-level signal is provided from the first OR gate OG1, the first AND gate AG1 may transmit the even-numbered write data provided from the even address data register 203 to the data comparator 121.

In an example, the second AND gate AG2 may perform an AND operation on odd-numbered write data output from the odd address data register 205 and a signal output from the first OR gate OG1, and may provide the result to a second input terminal of the data comparator 121. In an example, when a high-level signal is provided from the first OR gate OG1, the second AND gate AG2 may transmit the odd-numbered write data provided from the odd address data register 205 to the data comparator 121.

In an example, the third AND gate AG3 may perform an AND operation on an address corresponding to the current write data and a signal output from the first OR gate OG1, and may provide the result to a first input terminal of the address comparator 123. In an example, when a high-level signal is provided from the first OR gate OG1, the third AND gate AG3 may transmit the input address to the address comparator 123.

In an example, the data comparator 121 may compare the data input through the first input terminal with the data input through the second input terminal and may determine whether the two-input data are the same. In an example, the data comparator 121 may determine whether the even-numbered write data input through the first AND gate AG1 and the odd-numbered write data input through the second AND gate AG2 are the same. In an example, when the even-numbered write data and the odd-numbered write data are not the same, the data comparator 121 may output a high-level signal. When the even-numbered write data and the odd-numbered write data are the same, the data comparator 121 may output a low-level signal.

In an example, the address comparator 123 may compare the data input through the first input terminal with the data input through the second input terminal and may determine whether the two-input data are the same. The data input through the second input terminal may be preset to 0 (zero). In an example, the address comparator 123 may determine whether an address input through the third AND gate AG3 and a preset data (e.g., 0) input through the second input terminal are the same. When the input address and the preset data are the same, the address comparator 123 may output a high-level signal. When the input address and the preset data are not the same, the address comparator 123 may output a low-level signal.

In an example, the state information and line buffer controller 127 may include a third OR gate OG3, a seventh AND gate AG7, an eighth AND gate AG8, and a fourth OR gate OG4.

In an example, the third OR gate OG3 may perform an OR operation on the output signal of the data comparator 121, an inverted signal of the scoreboard write operation enable signal "sb_write_op_enable", and the output signal of the address comparator 123 and may output the result to the seventh AND gate AG7.

In an example, the seventh AND gate AG7 may perform an AND operation on an output signal of the third OR gate OG3, an inverted signal of the chip enable signal "cen", and an inverted signal of a write operation enable signal "wen", and may provide the result to the scoreboard 129 and the fourth OR gate OG4. The output signal of the seventh AND gate AG7 may mean state information of a current address corresponding to the current write data. In an example, when the output signal of the seventh AND gate AG7 is "1", this means that a write operation on the current address is performed, and when the output signal of the seventh AND gate AG7 is "0", this may mean that the write operation to the current address is skipped. When the write operation enable signal "wen" is at a low level, this may indicate a write operation, and when the write operation enable signal "wen" is at a high level, this may indicate a read operation.

In an example, the eighth AND gate AG8 may perform an AND operation on an output signal of the scoreboard 129, the inverted signal of the chip enable signal "cen", and the write operation enable signal "wen", and may provide the result to the fourth OR gate OG4. The output signal of the scoreboard 129 may mean the state information of the current address.

In an example, the fourth OR gate OG4 may perform an OR operation on the output signal of the seventh AND gate AG7 and the output signal of the eighth AND gate AG8, and may provide the result to a first NOT gate NG1 and the clock gating circuit 130.

In an example, the fourth AND gate AG4 may perform an AND operation on the inverted signal of the chip enable signal "cen" and the inverted signal of the write operation enable signal "wen", and may output the result to the fifth AND gate AG5 and the sixth AND gate AG6.

In an example, the fifth AND gate AG5 may perform an AND operation on an inverted signal of the output signal of the data comparator 121 and the output signal of the fourth AND gate AG4, and may provide the result to the equal data counter 125.

In an example, the sixth AND gate AG6 may perform an AND operation on the output signal of the address comparator 123 and the output signal of the fourth AND gate AG4, and may provide the result to the equal data counter 125.

In an example, the second OR gate OG2 may perform an OR operation on the monitoring enable signal "monitoring_enable" and the scoreboard write operation enable signal "sb_write_op_enable", and may provide the result to the equal data counter 125. The output signal of the second OR gate OG2 may be an enable signal for controlling whether to enable the equal data counter 125.

In an example, when a high-level signal is input from the second OR gate OG2, the equal data counter 125 may be enabled. The equal data counter 125 may maintain an enable state while a high-level signal is input from the second OR gate OG2. The equal data counter 125 may initialize the number of occurrences of the adjacent identical data, according to the signal input from the sixth AND gate AG6. The equal data counter 125 may count the number of occurrences of the adjacent identical data in accordance with the signal input from the fifth AND gate AG5.

In an example, the scoreboard 129 may include a second demultiplexer 211, a state information storage 212, and a second multiplexer 213.

In an example, the second demultiplexer 211 may be enabled or disabled according to the scoreboard write operation enable signal "sb_write_op_enable". In an example, when the scoreboard write operation enable signal "sb_write_op_enable" is at a high level, the second demultiplexer 211 may be enabled, and when the scoreboard write operation enable signal "sb_write_op_enable" is at a low level, the second demultiplexer 211 may be disabled. In the enabled state, the second demultiplexer 211 may receive a current address and state information. The second demultiplexer 211 may store the state information provided from the seventh AND gate AG7 in a bit corresponding to the current address among the n-bit state information storage 212.

In an example, the second multiplexer 213 may be enabled or disabled according to a scoreboard read operation enable signal "sb_read_op_enable". The scoreboard read operation enable signal "sb_read_op_enable" may enabled the scoreboard 129 such that the scoreboard can perform a read operation of the state information of each address during the read operation. In an example, the scoreboard read operation enable signal "sb_read_op_enable" may enable a function of skipping a read operation of adjacent identical data during the read operation. In an example, when the scoreboard read operation enable signal "sb_read_op_enable" is at a high level, the second multiplexer 213 may be enabled. When the scoreboard read operation enable signal "sb_read_op_enable" is at a low level, the second multiplexer 213 may be disabled. In the enabled state, the second multiplexer 213 may output the state information stored in a bit corresponding to the current address among the n-bit state information storage 212.

In an example, the first NOT gate NG1 may invert the signal output from the fourth OR gate OG4 of the state information and line buffer controller 127 and may provide it to a chip enable signal input terminal of the line buffer 140.

In an example, the clock gating circuit 130 may apply a clock signal to the line buffer 140 in accordance with the signal output from the fourth OR gate OG4 of the state information and line buffer controller 127. In an example, when the signal output from the fourth OR gate OG4 of the state information and line buffer controller 127 is at a high level, the clock gating circuit 130 may apply a clock signal to the line buffer 140. When the signal output from the fourth OR gate OG4 of the state information and line buffer controller 127 is at a low level, the clock gating circuit 130 may control a clock signal not to be applied to the line buffer 140. In an example, when the signal output from the fourth OR gate OG4 is at a low level, this means that a write operation or a read operation to and from the corresponding address is skipped, Therefore, the clock gating circuit 130 may control a clock signal not to be applied to the line buffer 140.

In an example, the line buffer 140 may be enabled or disabled according to the chip enable signal "cen" and the clock signal "clk". When the chip enable signal "cen" is at a low level and the clock signal is applied, the line buffer 140 may be enabled. When the chip enable signal "cen" is at a high level and/or the clock signal is not applied, the line buffer 140 may be disabled. The line buffer 140 in an enabled state may perform a write operation or a read operation according to the write operation enable signal "wen". In an example, when the write operation enable signal "wen" is at a low level, the line buffer 140 may perform the write operation of storing the input data in the input address, and when the write operation enable signal "wen" is at a high level, the line buffer 140 may perform the read operation of outputting the data stored in the input address.

Figure 3:
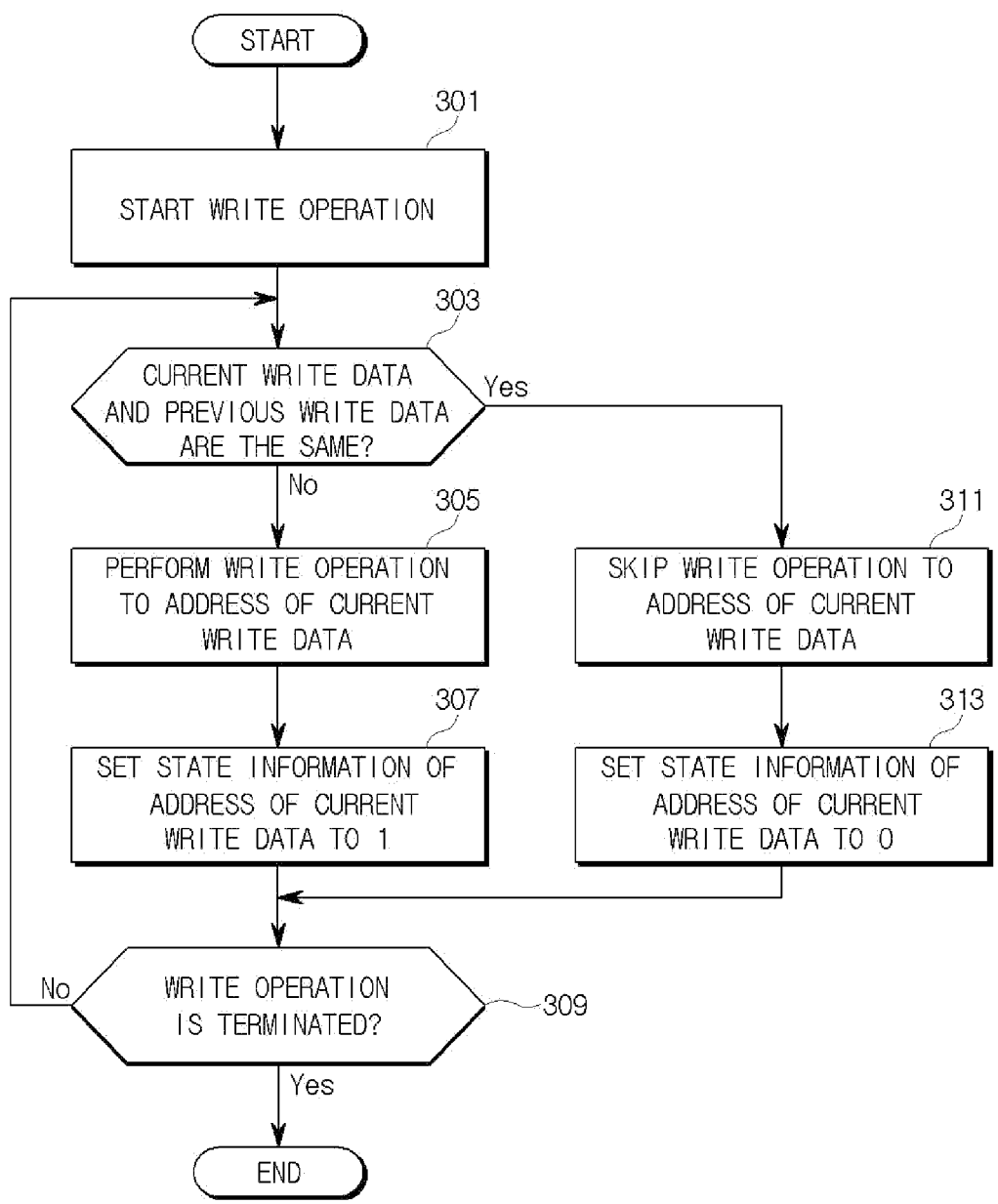
FIG. 3 illustrates a flowchart showing that a write operation is performed by the image processing apparatus according to one or more embodiments of the present disclosure.

FIG. 3 illustrates a flowchart showing that the write operation is performed by the image processing apparatus 100 according to one or more embodiments of the present disclosure. Here, the image processing apparatus 100 may be the image processing apparatus 100 of FIG. 1. In the following embodiment, respective steps may be sequentially performed, and may not be necessarily performed sequentially. In an example, the order of the respective steps may be changed, and at least two steps may be performed in parallel.

Referring to FIG. 3, the image processing apparatus 100 may determine to start a write operation in step 301. In an example, when the write operation enable signal "wen" at a low level is detected or when a signal "write_start" (write operation start signal) indicating the start of a write operation to the line buffer 140 is detected, the image processing apparatus 100 may determine to start a write operation.

The image processing apparatus 100 may compare whether the current write data and the previous write data are the same in step 303. In an example, the image processing apparatus 100 may receive a write data and an address corresponding to the write data through the data storage register 110. The image processing apparatus 100 may compare whether the current write data corresponding to a currently input address and the previous write data corresponding to a previously input address are the same.

When the current write data and the previous write data are not the same, the image processing apparatus 100 may perform a write operation to the address of the current write data in step 305. In an example, when the current write data and the previous write data are not the same, the image processing apparatus 100 may enable the line buffer 140 to store the current write data at the address of the current write data.

In step 307, the image processing apparatus 100 may set the state information of the address of the current write data to "1". In an example, the image processing apparatus 100 may store the state information of the address of the current write data as "1" in the enabled scoreboard 129. The state information "1" may mean that the write data of the corresponding address is different from the write data of the previous address.

When the current write data and the previous write data are the same, the image processing apparatus 100 may skip the write operation to the address of the current write data in step 311. In an example, when the current write data and the previous write data are the same, the image processing apparatus 100 may disable the line buffer 140 and skip an operation of storing the current write data at the address of the current write data.

In step 313, the image processing apparatus 100 may set the state information of the address of the current write data to "0". In an example, the image processing apparatus 100 may store the state information of the address of the current write data as "0" in the enabled scoreboard 129. The state information "0" may mean that the write data of the corresponding address is the same as the write data of the previous address.

In step 309, the image processing apparatus 100 may determine whether the write operation is terminated. In an example, when the write operation enable signal "wen" at a high level is detected or when a signal for disabling the line buffer 140 is detected, the image processing apparatus 100 may determine to end the write mode. When the write operation is not ended, the image processing apparatus 100 may proceed to the step 303 and perform the subsequent steps again.

Figure 4A:
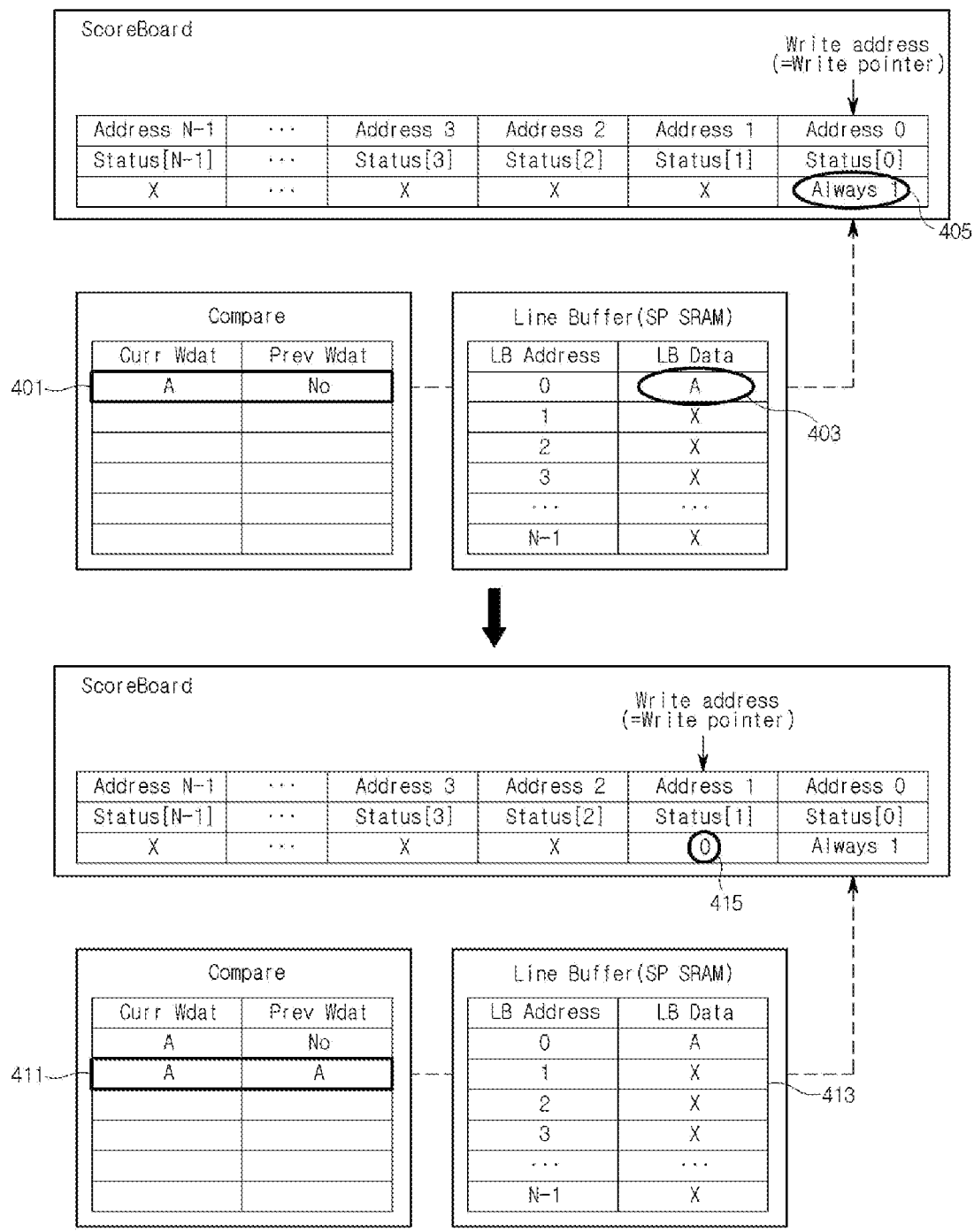
FIGS. 4A and 4B illustrate example diagrams showing that the write operation is performed by the image processing apparatus according to one or more embodiments of the present disclosure.
Figure 4B:
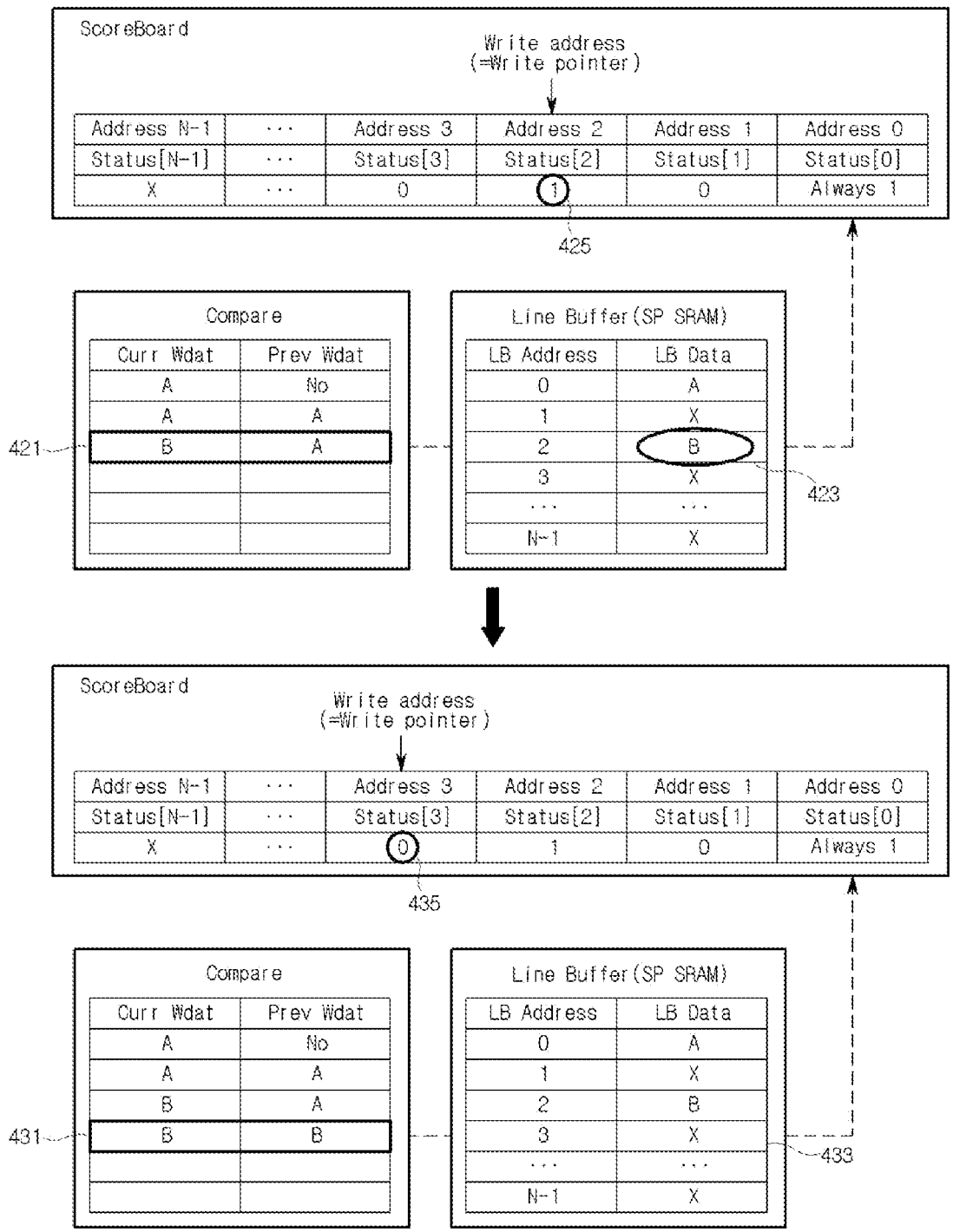

FIGS. 4A and 4B illustrate example diagrams showing that the write operation is performed by the image processing apparatus according to one or more embodiments of the present disclosure.

As shown in FIGS. 4A and 4B, first, when a current write data corresponding to Address 0 is "A" (see reference numeral 401), the image processing apparatus 100 has no previous write data, so that the image processing apparatus 100 may store "A" in the Address 0 of the line buffer (see reference numeral 403) and may store the state information of the Address 0 as "1" (see reference numeral 405). Here, since the previous write data for the write data of Address 0 does not always exist, the state information of Address 0 may always be stored as "1".

Next, when the current write data corresponding to Address 1 is "A", the image processing apparatus 100 may skip the write operation to Address 1 of the line buffer (see reference numeral 413) and may store the state information of Address 1 of the scoreboard 129 as "0" (see reference numeral 415) because both the current write data and the previous write data are the same as "A" (see reference numeral 411).

Next, when the current write data corresponding to Address 2 is "B", the image processing apparatus 100 may store "B" in Address 2 of the line buffer (see reference numeral 423) and may store the state information of Address 2 of the scoreboard 129 as "1" (see reference numeral 425) because the current write data is "B" and the previous write data is "A" and thus they are not the same as each other (see reference numeral 421).

Next, when the current write data corresponding to Address 3 is "B", the image processing apparatus 100 may skip the write operation to Address 3 of the line buffer (see reference numeral 433) and may store the state information of Address 3 of the scoreboard 129 as "0" (see reference numeral 435) because both the current write data and the previous write data are the same as "B" (see reference numeral 431).

As described above, the image processing apparatus 100 may compare the current write data and the previous write data and may perform or skip the write operation to the current write data.

Figure 5:
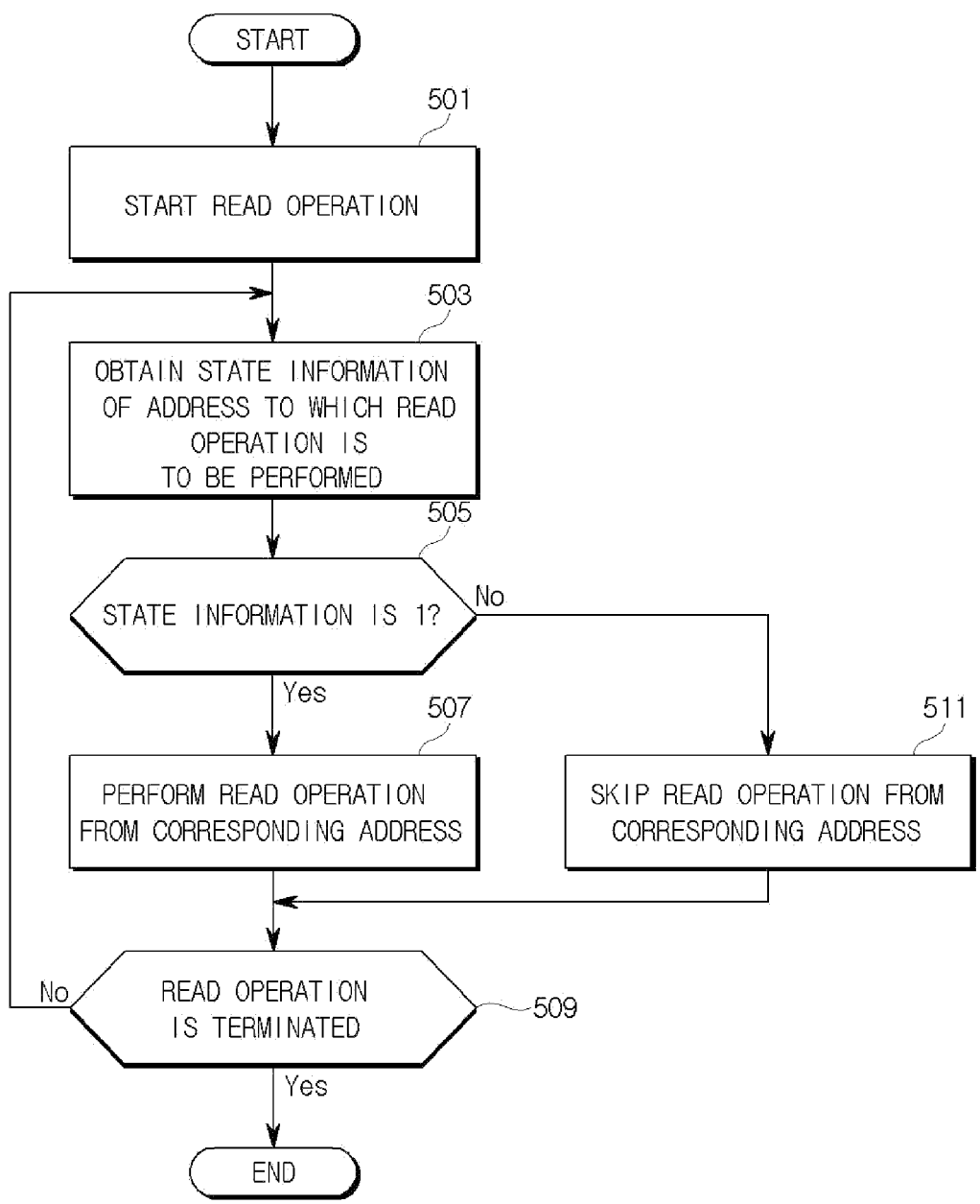
FIG. 5 illustrates a flowchart showing that a read operation is performed by the image processing apparatus according to one or more embodiments of the present disclosure.

FIG. 5 illustrates a flowchart showing that the read operation is performed by the image processing apparatus according to one or more embodiments of the present disclosure. Here, the image processing apparatus 100 may be the image processing apparatus 100 of FIG. 1. In the following embodiment, respective steps may be sequentially performed, and may not be necessarily performed sequentially. In an example, the order of the respective steps may be changed, and at least two steps may be performed in parallel.

Referring to FIG. 5, the image processing apparatus 100 may determine to start a read operation in step 501. In an example, when the write operation enable signal "wen" at a high level is detected or when a signal "read_start" (read operation start signal) indicating the start of a read operation from the line buffer 140 is detected, the image processing apparatus 100 may determine to start the read operation.

In step 503, the image processing apparatus 100 may obtain state information of an address to which the read operation is to be performed. In an example, the image processing apparatus 100 may obtain the state information of a current input address from the enabled scoreboard.

The image processing apparatus 100 may check whether the state information is "1" in step 505.

When the state information is "1", the image processing apparatus 100 may determine a write operation as having been performed on the corresponding address, and in step 507 may perform a read operation from the corresponding address. In an example, when the state information is "1", the image processing apparatus 100 may control the line buffer 140 to be enabled by applying a clock signal to the line buffer 140 and may read the data stored in the current input address.

When the state information is "0", the image processing apparatus 100 may determine that the write operation for the corresponding address is skipped, and may skip the read operation for the corresponding address in step 511. In an example, when the state information is "0", the image processing apparatus 100 may disable the line buffer 140 by preventing a clock signal from being applied to the line buffer 140.

In step 509, the image processing apparatus 100 may determine whether the read operation is terminated. In an example, when the write operation enable signal "wen" at a low level is detected or when a signal for disabling the line buffer 140 is detected, the image processing apparatus 100 may determine to terminate the read operation. When the read operation is not terminated, the image processing apparatus 100 may proceed to step 503 and perform the subsequent steps again.

Figure 6A:
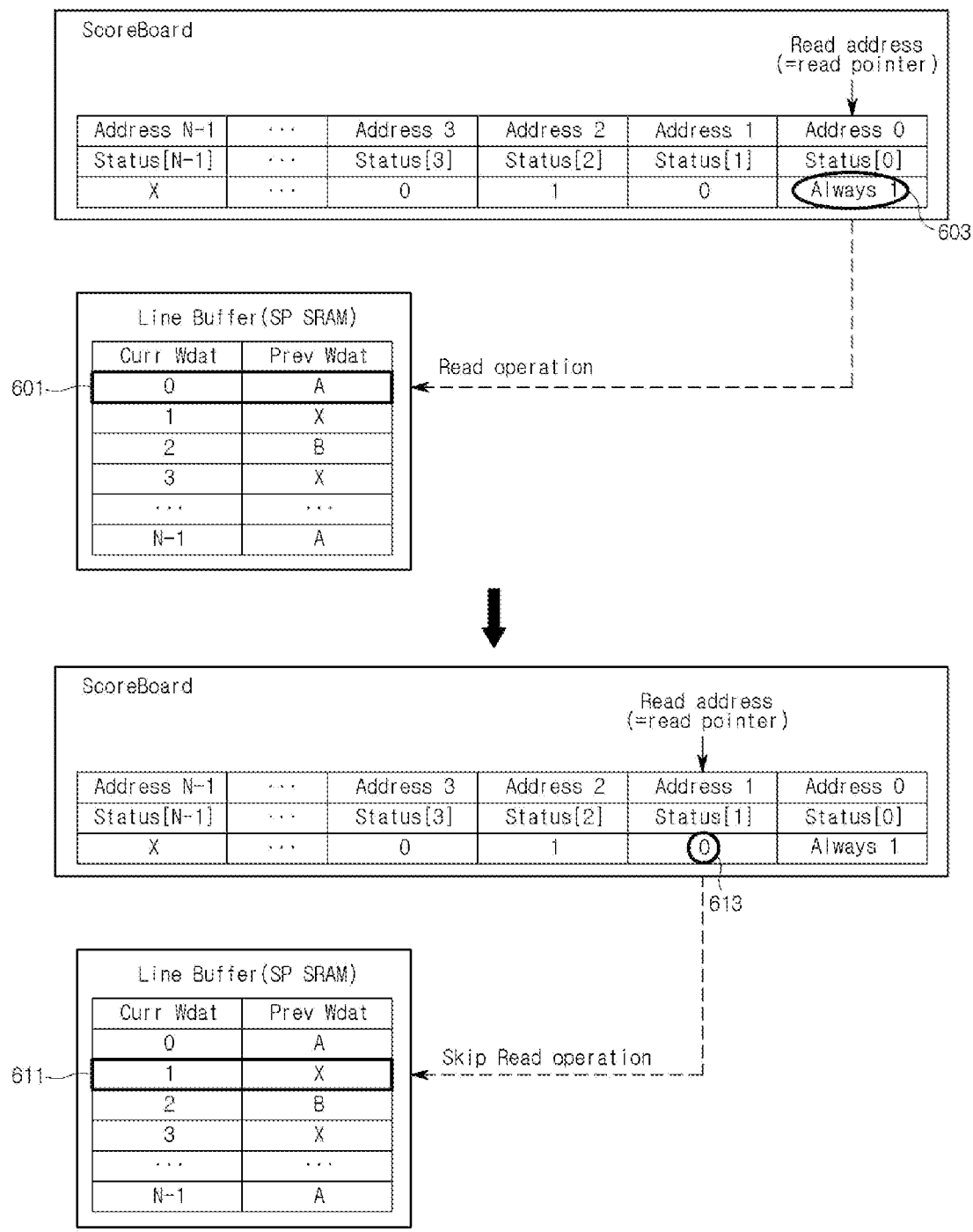
FIGS. 6A and 6B illustrate example diagrams showing that the read operation is performed by the image processing apparatus according to one or more embodiments of the present disclosure.
Figure 6B:
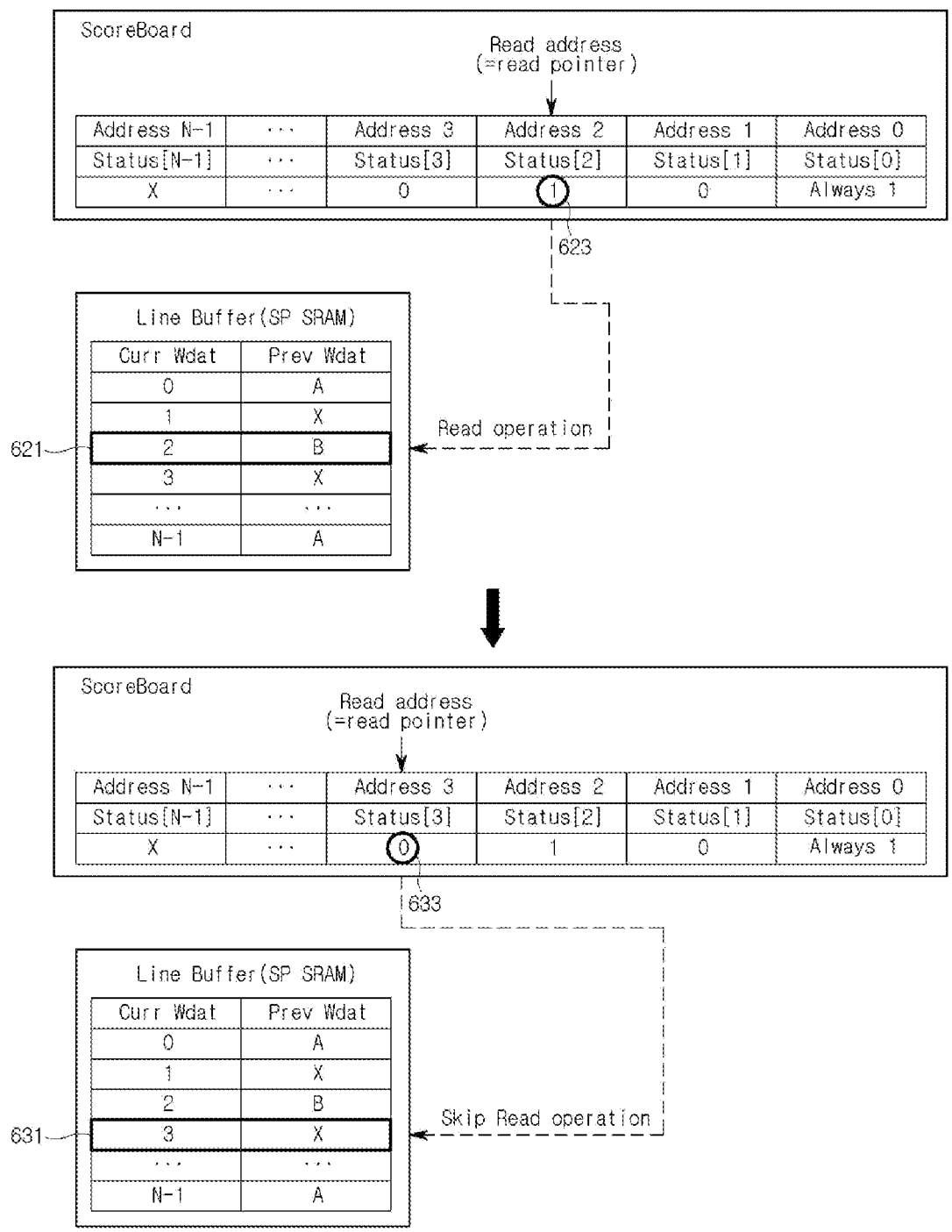

FIGS. 6A and 6B illustrate exemplary diagrams showing that a read operation is performed by the image processing apparatus according to one or more embodiments of the present disclosure.

As shown in FIGS. 6A and 6B, the image processing apparatus 100 may check that the state information of Address 0 is "1" in the scoreboard 129 (see reference numeral 603) and may perform a read operation from Address 0 of the line buffer (see reference numeral 601), thereby reading data "A" stored in Address 0.

Next, the image processing apparatus 100 may check that the state information of Address 1 is "0" in the scoreboard 129 (see reference numeral 613) and may skip a read operation from Address 1 of the line buffer (see reference numeral 611).

Next, the image processing apparatus 100 checks that the state information of Address 2 is "1" in the scoreboard 129 (see reference numeral 623) and may perform a read operation from Address 2 of the line buffer (see reference numeral 621), thereby reading data "B" stored in Address 2.

Next, the image processing apparatus 100 may check that the state information of Address 3 is "0" in the scoreboard 129 (see reference numeral 633) and may skip a read operation from Address 3 of the line buffer (see reference numeral 631).

As described above, the image processing apparatus 100 may perform or skip a read operation from each address of the line buffer, according to the state information of each address stored in the scoreboard 129.

FIGS. 7 and 8 illustrate exemplary diagrams showing that the number of times read/write operations are skipped according to image data by the image processing apparatus in one or more embodiments of the present disclosure. In an example, FIGS. 7 and 8 show how many write and/or read operations are performed and skipped according to the number of occurrences of adjacent identical data.

First, FIG. 7 shows that data from Address 0 to Address 9 are "A, A, B, B, B, C, C, D, D, and E". In this case, the state information of each address of the scoreboard 129 becomes "1, 0, 1, 0, 0, 1, 0, 1, 0, and 1", and the image processing apparatus 100 may only perform write operations and read operations to and from Address 0 (see reference numeral 701), Address 2 (see reference numeral 703), Address 5 (see reference numeral 705), Address 7 (see reference numeral 707), and Address 9 (see reference numeral 709) and may skip write operations and read operations to and from other addresses (Address 1, Address 3, Address 4, Address 6, and Address 8). In other words, since the length of the line buffer is 10, the conventional method performs the write operation and the read operation ten times. However, the method proposed in the present disclosure can reduce the number of times the write operation and the read operation are performed to five times respectively.

Next, FIG. 8 illustrates that all data from Address 0 to Address 9 are "A". In this case, the state information of each address of the scoreboard 129 becomes "1, 0, 0, 0, 0, 0, 0, 0, 0, and 0", and the image processing apparatus 100 may perform only the write operation and read operation to and from Address 0 (see reference numeral 801) and may skip the write operations and read operations to and from other addresses (Address 1 to Address 9) (see reference numeral 803). In other words, since the length of the line buffer is 10, the conventional method performs the write operation and the read operation ten times. However, the method proposed in the present disclosure can reduce the number of times the write operation and the read operation are performed to one respectively.

Figure 9:
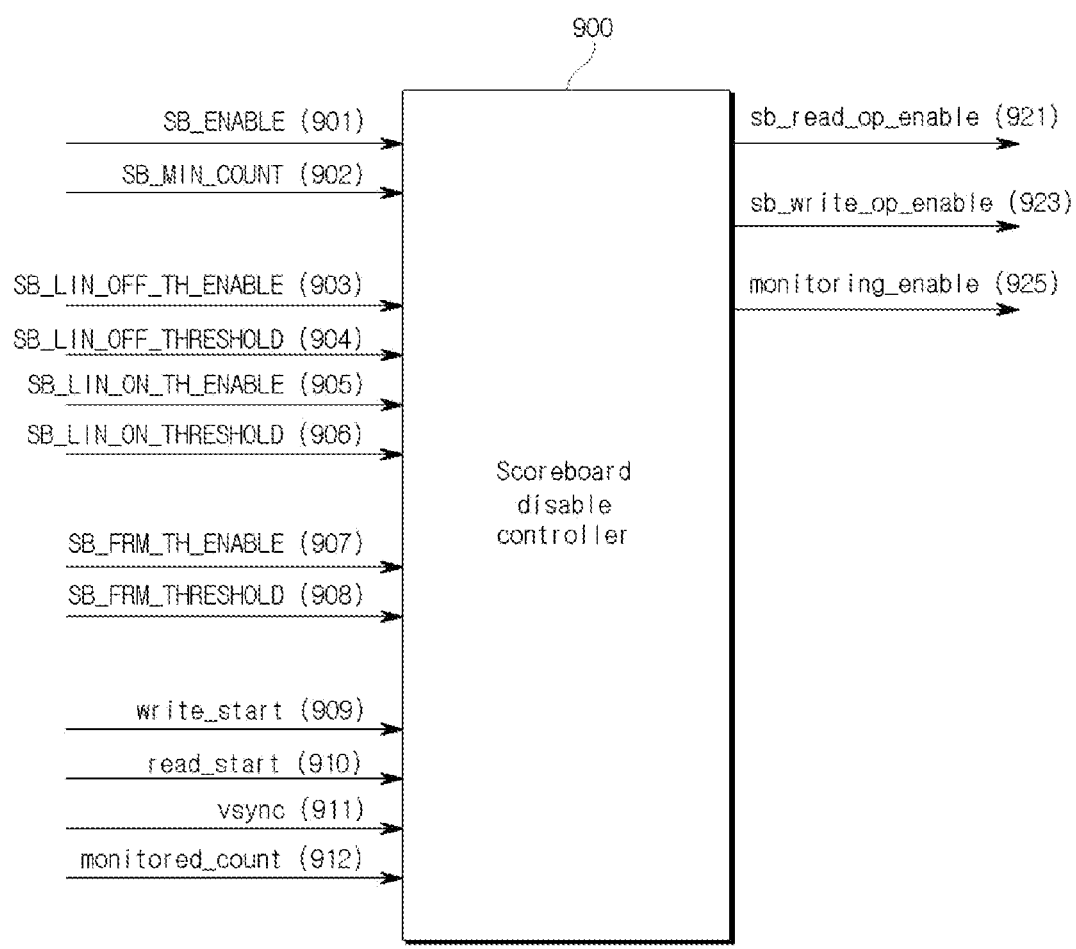
FIG. 9 illustrates a view showing a signal configuration and a register of a scoreboard enable controller in the image processing apparatus according to one or more embodiments of the present disclosure.

FIG. 9 illustrates a view showing a signal configuration and a register of the scoreboard enable controller in the image processing apparatus according to one or more embodiments of the present disclosure.

A scoreboard disable controller 900 shown in FIG. 9 may be included in the scoreboard enable controller 150 of FIG. 1. In an example, the scoreboard disable controller 900 controls the enable state of the scoreboard 129 according to data of a specified unit (e.g., line unit, block unit, or frame unit), thereby enabling or disabling a function of skipping write and/or read operations of the adjacent identical data.

The scoreboard disable controller 900 may output a scoreboard read operation enable signal "sb_read_op_enable" 921, a scoreboard write operation enable signal "sb_write_op_enable" 923, and a monitoring enable signal "monitoring_enable" 925, according to setting registers and signals 901 to 912 shown in FIG. 9.

The setting registers and signals 901 to 912 shown in FIG. 9 are defined as follows.

The "SB_ENABLE" 901 may be a register that sets the enable state of the scoreboard 129. In an example, "SB_ENABLE=0" may mean disable of the scoreboard 129, and "SB_ENABLE=1" may mean enable of the scoreboard 129.

The "SB_MIN_COUNT" 902 may be a setting register that specifies a value of the required minimum number of adjacent identical data for data within a line or block unit.

The "SB_LIN_OFF_TH_ENABLE" 903 may be a setting register that disables the scoreboard 129 according to the number of occurrences of the adjacent identical data.

In an example, in the case of "SB_ENABLE=1" and "SB_LIN_OFF_TH_ENABLE=0", the scoreboard 129 can be always enabled regardless of the number of adjacent identical data. In an example, when "SB_ENABLE=1" and "SB_LIN_OFF_TH_ENABLE=0", the scoreboard read operation enable signal "sb_read_op_enable" 921 and the scoreboard write operation enable signal "sb_write_op_enable" 923 may have a value of "1" respectively.

In an example, in the case of "SB_ENABLE=1" and "SB_LIN_OFF_TH_ENABLE=1", the scoreboard is enabled by "vsync" 911 that indicates the start of the image frame. However, when a value "off_threshold_count" (first count value) obtained by counting a case where the number of occurrences of the adjacent identical data does not reach a specified value of a minimum number reaches the specified first number of acceptable thresholds "SB_LIN_OFF_THRESHOLD" 904, the scoreboard 129 may be disabled.

The "SB_LIN_OFF_THRESHOLD" 904 may be a setting register that specifies the first number of acceptable thresholds for the first count value obtained by counting the case where the number of occurrences of the adjacent identical data does not reach the specified value of the minimum number.

In a state where the scoreboard is disabled by the operation of the SB_LIN_OFF_TH_ENABLE 903, the "SB_LIN_ON_TH_ENABLE" 905 may be a setting register that enables the scoreboard 129 again according to the number of occurrences of the adjacent identical data.

In an example, in the case of "SB_ENABLE=1", "SB_LIN_OFF_TH_ENABLE=1", and "SB_LIN_ON_TH_ENABLE=1", when a value "on_threshold_count" (second count value) obtained by counting a case where the number of occurrences of the adjacent identical data is equal to or greater than the specified value of the minimum number reaches the specified second number of acceptable thresholds "SB_LIN_ON_THRESHOLD" 906, the scoreboard 129 may be enabled again.

The "SB_LIN_ON_THRESHOLD" 906 may be a setting register that specifies the second number of acceptable thresholds for the second count value obtained by counting the case where the number of occurrences of the adjacent identical data is equal to or greater than the specified value of the minimum number.

On the basis of the first count value "off_threshold_count" of the previous image frame, the "SB_FRM_TH_ENABLE" 907 may determine whether to enable the scoreboard 129 during processing the next image frame.

The "SB_FRM_THRESHOLD" 908 may be a setting register that specifies a third number of acceptable thresholds for the first count value obtained by counting the case where the number of occurrences of the adjacent identical data does not reach the specified value of the minimum number.

In an example, when the first count value "off_threshold_count" of the previous image frame is less than the third number of acceptable thresholds "SB_FRM_THRESHOLD" 908, the value of the scoreboard write operation enable signal "sb_write_op_enable" 923 and the value of the scoreboard read operation enable signal "sb_read_op_enable" 921 during processing the next image frame may be "1" respectively. In an example, when the value "off_threshold_count" obtained by counting a case where the number of occurrences of the adjacent identical data does not reach the specified value of the minimum number does not reach the specified third number of acceptable thresholds "SB_FRM_THRESHOLD" 908 in the previous image frame, the "SB_FRM_TH_ENABLE" 907 can control the scoreboard to be enabled in the next image frame.

In an example, when the first count value "off_threshold_count" of the previous image frame is equal to or greater than the third number of acceptable thresholds "SB_FRM_THRESHOLD" 908, the value of the scoreboard write operation enable signal "sb_write_op_enable" 923 and the value of the scoreboard read operation enable signal "sb_read_op_enable" 921 during processing the next image frame may be "0" respectively. In an example, when the value "off_threshold_count" obtained by counting a case where the number of occurrences of the adjacent identical data does not reach the specified value of the minimum number reaches the specified third number of acceptable thresholds "SB_FRM_THRESHOLD" 908 in the previous image frame, the "SB_FRM_TH_ENABLE" 907 can control the scoreboard to be disabled in the next image frame.

The "write_start" 909 may be a signal that indicates the start of a write operation to the line buffer 140, and may indicate the start of a write operation of data in lines or units of specific blocks.

The "read_start" 910 may be a signal that indicates the start of a read operation from the line buffer 140, and may indicate the start of a read operation of data in lines or units of specific blocks.

The "vsync" 911 may be a signal that indicates the start of an image frame.

The "monitored_count" 912 may indicate how many adjacent identical data are generated in lines or units of specific blocks. The "monitored_count" 912 may be obtained by the equal data counter 125 shown in FIGS. 1 and/or 2.

The "sb_read_op_enable" 921 may be the scoreboard read operation enable signal described in FIGS. 1 and/or 2 and may be an enable signal that enables the state information of each address stored in the scoreboard 129 to be read when performing a read operation.

The "sb_write_op_enable" 923 may be the scoreboard write operation enable signal described in FIGS. 1 and/or 2 and may be an enable signal that enables the state information of each address to be stored in the scoreboard 129 when performing a write operation.

The "monitoring_enable" 925 may be the monitoring enable signal mentioned in FIGS. 1 and/or 2 and may be a signal that controls whether to monitor the number of occurrences of the adjacent identical data.

In an example, when the signal "monitoring_enable" 925 is output as "1" in a situation where "SB_FRM_TH_ENABLE=1" or "SB_LIN_OFF_TH_ENABLE=1 and SB_LIN_ON_TH_ENABLE=1", the signal "monitoring_enable" 925 may control such that the number of occurrences of adjacent identical data may be monitored, even when the scoreboard is disabled.

In an example, when the signal "monitoring_enable" 925 is output as "0" in a situation where "SB_LIN_OFF_TH_ENABLE=1" and "SB_LIN_ON_TH_ENABLE=0", the signal "monitoring_enable" 925 may control such that the number of occurrences of adjacent identical data is monitored, only when the scoreboard is enabled.

Further description of the first to third number of acceptable thresholds will be given with reference to the following Table 1.

TABLE 1

| Number of acceptable thresholds | Function description |
| --- | --- |
| First number of acceptable thresholds 904 (SB_LIN_OFF_THRESHOLD) | Number of acceptable thresholds for the count value in the case of not reaching the value of the required minimum number of the adjacent identical data in order to disable the scoreboard |
| Second number of acceptable thresholds 906 (SB_LIN_ON_THRESHOLD) | Number of acceptable thresholds for the count value in the case of being equal to or greater than the value of the required minimum number of the adjacent identical data in order to enable the scoreboard |
| Third number of acceptable thresholds 908 (SB_FRM_THRESHOLD) | For one frame, number of acceptable thresholds for the count value in the case of not reaching the value of the required minimum number of the adjacent identical data in order to enable or disable the scoreboard |

Figure 10A:
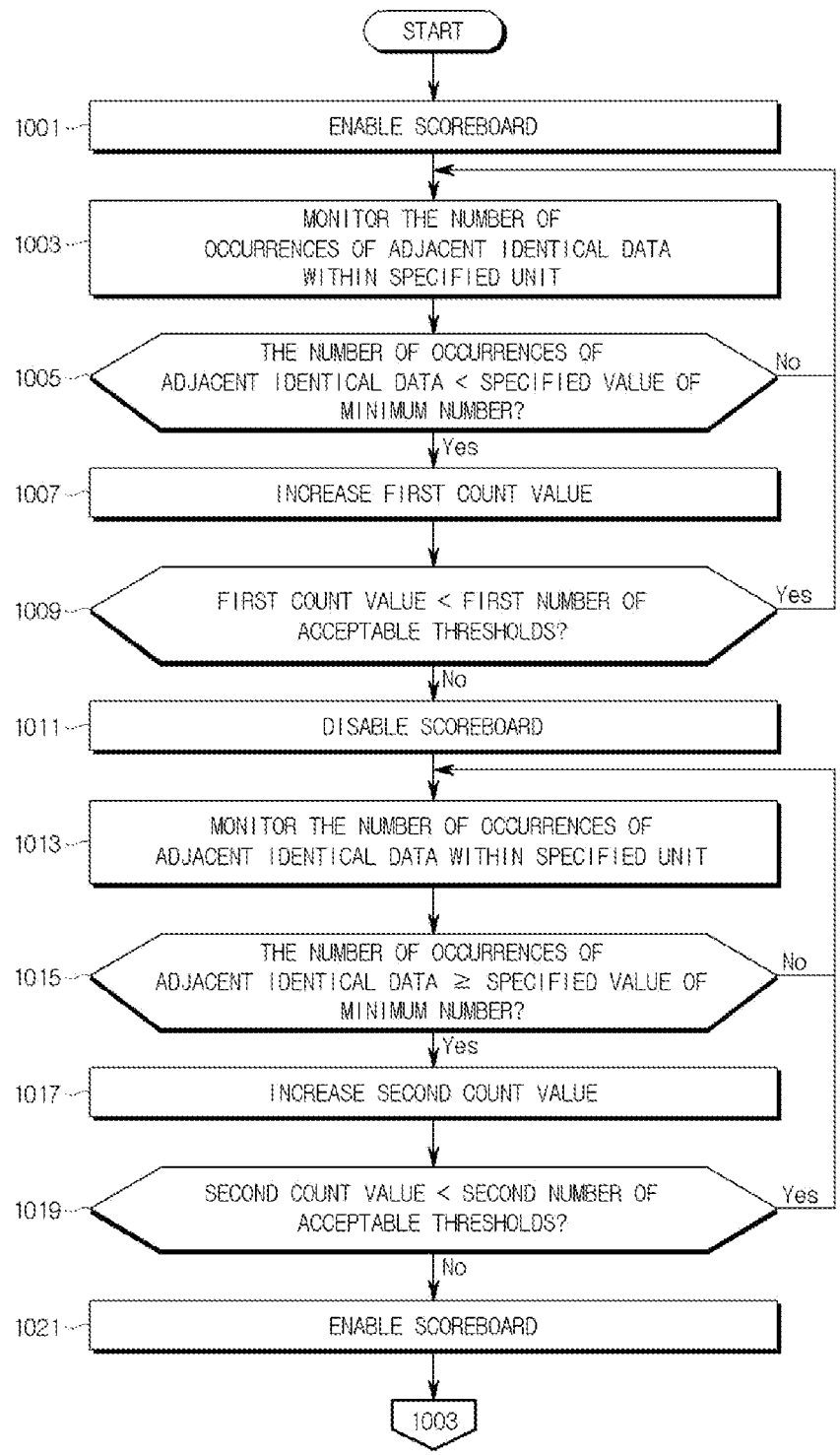
FIGS. 10A and 10B illustrate flowcharts showing that an enable state of the scoreboard is controlled in the image processing apparatus according to one or more embodiments of the present disclosure.
Figure 10B:
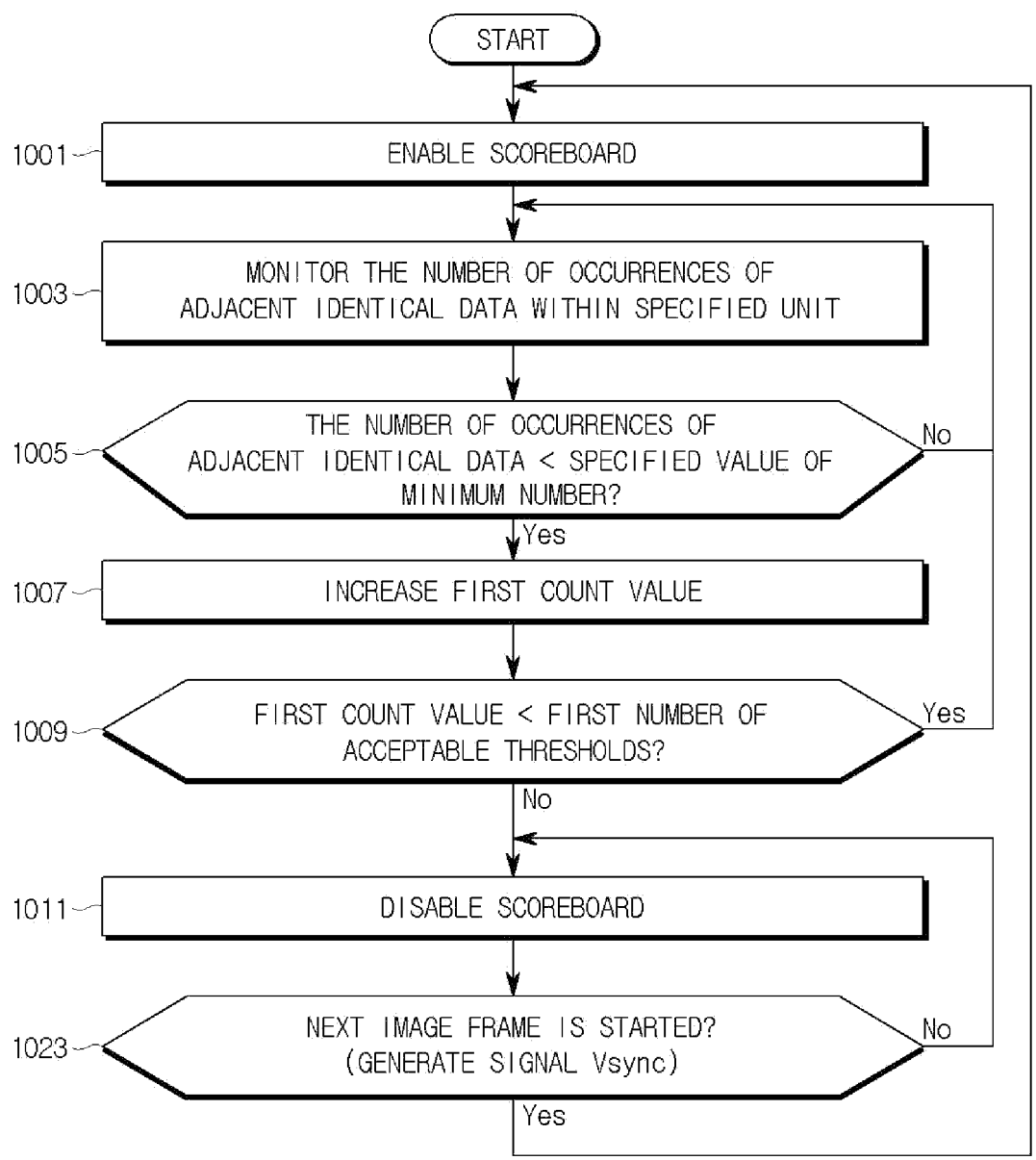

FIGS. 10A and 10B illustrate flowcharts showing that an enable state of the scoreboard 129 may be controlled in the image processing apparatus according to one or more embodiments of the present disclosure. Here, the image processing apparatus 100 may be the image processing apparatus 100 of FIG. 1. In the following embodiment, respective steps may be sequentially performed, and may not be necessarily performed sequentially. In an example, the order of the respective steps may be changed, and at least two steps may be performed in parallel. Referring to FIG. 10A, the image processing apparatus 100 may enable the scoreboard 129 in step 1001. In an example, when a signal indicating the start of an image frame is detected, the image processing apparatus 100 may enable the scoreboard 129 in order to store and/or read the state information of each address of the image frame. In an example, when the "SB_ENABLE" 901 is "1", the "SB_LIN_OFF_TH_ENABLE" 903 is "0", and the SB_LIN_ON_TH_ENABLE" 905 is "0" in FIG. 9, the image processing apparatus 100 can always enable the scoreboard 129 irrespective of the number of occurrences of the adjacent identical data within the image frame.

However, in an example, FIG. 10A illustrates a case where the "SB_ENABLE" 901 is "1", the "SB_LIN_OFF_TH_ENABLE" 903 is "1", and the SB_LIN_ON_TH_ENABLE" 905 is "1" in FIG. 9. As illustrated in FIG. 9, when the "SB_ENABLE" 901 is "1", the "SB_LIN_OFF_TH_ENABLE" 903 is "1", and the SB_LIN_ON_TH_ENABLE" 905 is "1", the scoreboard 129 can be enabled or disabled according to the number of occurrences of the adjacent identical data within the image frame.

In step 1003, the image processing apparatus 100 may monitor the number of occurrences of adjacent identical data within a specified unit. The specified unit may be, in an example, a line unit or a block unit.

In step 1005, the image processing apparatus 100 may determine whether the number of occurrences of the adjacent identical data is less than the specified value of the minimum number. The specified value of the minimum number may be specified by the "SB_MIN_COUNT" 902 of FIG. 9.

In an example, when the number of occurrences of the adjacent identical data is greater than or equal to the specified value of the minimum number, the image processing apparatus 100 may return to step 1003.

In an example, when the number of occurrences of the adjacent identical data is less than the specified value of the minimum number, the image processing apparatus 100 may increase the first count value in step 1007. The first count value is a value obtained by counting a case where the number of occurrences of the adjacent identical data does not reach the specified value of the minimum number. The first count value may be initialized to 0 at a point of time when the scoreboard is changed from an disable state to an enable state.

In step 1009, the image processing apparatus 100 may determine whether the first count value is less than the first number of acceptable thresholds. The first number of acceptable thresholds may be specified by the "SB_LIN_OFF_THRESHOLD" 904 of FIG. 9.

In an example, when the first count value is less than the first number of acceptable thresholds, the image processing apparatus 100 may return to step 1003.

In an example, when the first count value is not less than the first number of acceptable thresholds, that is to say, when the first count value reaches the first number of acceptable thresholds, the image processing apparatus 100 may disable the scoreboard 129 in step 1011. Here, other components within the data processor 120 (e.g., the data comparator 121, the address comparator 123, the equal data counter 125, and/or the state information and line buffer controller 127) can be maintained in the enable state.

In addition, the image processing apparatus may enable the scoreboard again according to the number of occurrences of the adjacent identical data within the image frame. After the scoreboard is disabled, the image processing apparatus 100 may monitor the number of occurrences of adjacent identical data within a specified unit in step 1013. That is, even if the scoreboard is disabled, components other than the scoreboard 129 of the data processor 120 must maintain the enable state in order to monitor the number of occurrences of adjacent identical data. Next, in step 1015, the image processing apparatus 100 may determine whether the number of occurrences of adjacent identical data is greater than or equal to the specified value of the minimum number.

In an example, when the number of occurrences of adjacent identical data is less than the specified value of the minimum number, the image processing apparatus 100 may return to step 1013.

In an example, when the number of occurrences of adjacent identical data is greater than or equal to the specified value of the minimum number, the image processing apparatus 100 may increase the second count value in step 1017. The second count value may mean a value obtained by counting a case where the number of occurrences of adjacent identical data is equal to or greater than the specified value of the minimum number.

In step 1019, the image processing apparatus 100 may determine whether the second count value is less than the second number of acceptable thresholds. The second number of acceptable thresholds may be specified by the "SB_LIN_ON_THRESHOLD" 906 of FIG. 9.

In an example, when the second count value is less than the second number of acceptable thresholds, the image processing apparatus 100 may return to step 1013.

In an example, when the second count value is not less than the second number of acceptable thresholds, that is, when the second count value reaches the second number of acceptable thresholds, the image processing apparatus 100 may enable the scoreboard 129 again in step 1021.

FIG. 10B illustrates operations of the image processing apparatus 100 according to one or more embodiments of the present disclosure. In an example, FIG. 10B illustrates a case where the "SB_ENABLE" 901 is "1", the "SB_LIN_OFF_TH_ENABLE" 903 is "1", and the SB_LIN_ON_TH_ENABLE" 905 is "0" in FIG. 9. Referring to FIG. 10B, steps 1001 to 1011 of the image processing apparatus 100 may be the same as steps 1001 to 1011 of FIG. 10A. However, in FIG. 10B, in step 1011, the image processing apparatus 100 may further disable not only the scoreboard but also at least one other component of the data processor 120 (e.g., the data comparator 121, the address comparator 123, the equal data counter 125, and/or the state information and line buffer controller 127). In an example, in step 1011 of FIG. 10B, the entire data processor 120 including the scoreboard may be disabled. Here, the image processing apparatus 100 may disable the scoreboard, and then may disable all other components of the data processor 120 after the scoreboard is disabled. Alternatively, the image processing apparatus 100 may control the scoreboard and other components of the data processor 120 to be disabled at least temporarily at the same point of time.

Accordingly, when there is a small amount of the adjacent identical data, the image processing apparatus 100 may disable all of the components of the data processor 120, thereby preventing dynamic power from being generated due to the data comparison operation, the adjacent identical data counting operation, and the state information update operation.

The image processing apparatus 100 may determine whether the next image frame has started in step 1023. That is, when a new signal Vsync is not generated, the image processing apparatus 100 may maintain the data processor 120 including the scoreboard 129 in the disable state.

If the next image frame starts or a new signal Vsync is generated, the image processing apparatus 100 may enable the data processor 120 including the scoreboard 129 again.

Although not shown in FIGS. 10A and 10B, as illustrated in FIG. 9, based on the first count value of the previous image frame, the image processing apparatus 100 may determine whether to enable or disable the scoreboard 129 during processing data of the next image frame. In an example, when the first count value of the previous image frame is greater than or equal to the third number of acceptable thresholds "SB_FRM_THRESHOLD" 908, the image processing apparatus 100 may control the scoreboard to be disabled during processing the next image frame. After the scoreboard is disabled, the image processing apparatus 100 may maintain the components other than the scoreboard 129 of the data processor 120 in the enable state in order to continuously monitor the number of occurrences of adjacent identical data. Then, when the first count value of the previous image frame becomes smaller than the third number of acceptable thresholds "SB_FRM_THRESHOLD" 908, the image processing apparatus 100 may control the scoreboard to be enabled during processing the next image frame.

Figure 11A:
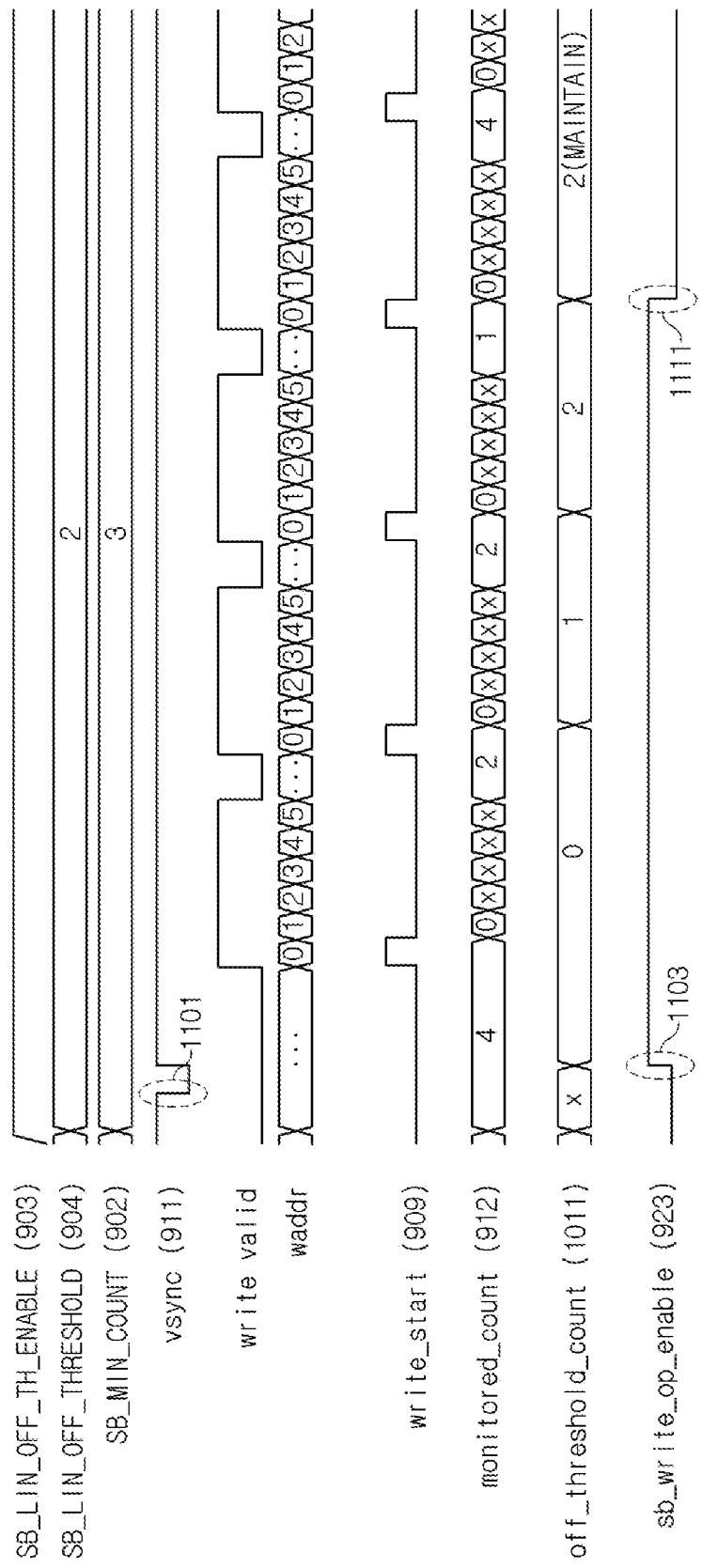
FIGS. 11A and 11B illustrate signal timing diagrams showing that the enable state of the scoreboard is controlled according to one or more embodiments of the present disclosure.
Figure 11B:
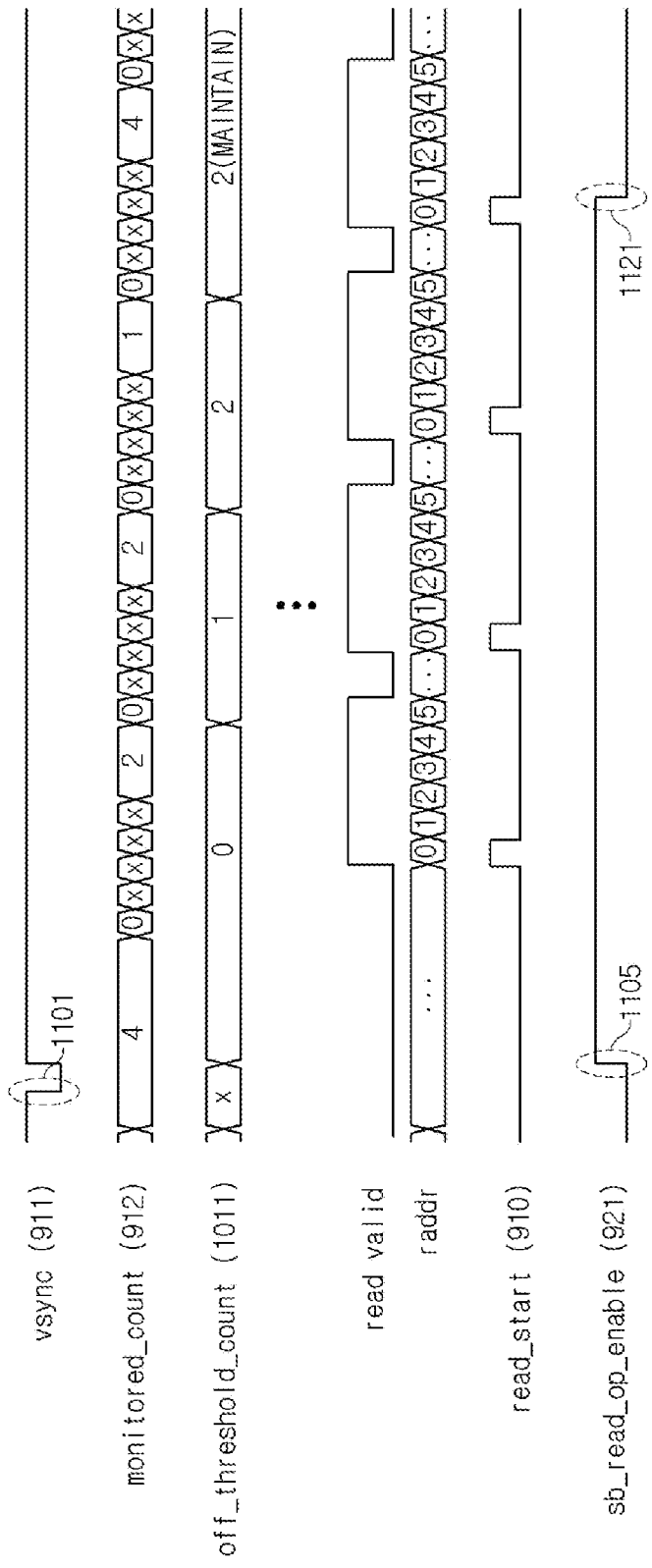

FIGS. 11A and 11B illustrate signal timing diagrams showing that the enable state of the scoreboard 129 may be controlled according to one or more embodiments of the present disclosure.

In FIGS. 11A and 11B, it is assumed that the "SB_LIN_OFF_TH_ENABLE" 903 is at a high level, the "SB_LIN_OFF_THRESHOLD" 904 is "2", and the "SB_MIN_COUNT" 902 is "3".

Since the "SB_LIN_OFF_TH_ENABLE" 903 is at a high level, when the "vsync" 911 indicating the start of the image frame is detected, the scoreboard disable controller 900 may enable the scoreboard 129. In an example, when "vsync" is changed from a high level to a low level (see reference numeral 1101), the scoreboard disable controller 900 may detect the start of the image frame. When the start of the image frame is detected, the scoreboard disable controller 900 outputs the scoreboard write operation enable signal "sb_write_op_enable" 923 and the scoreboard read operation enable signal "sb_read_op_enable" 921 at a high level, respectively (see reference numerals 1103 and 1105), so that the scoreboard can be controlled to be enabled.

After the scoreboard 129 is enabled, the "write_start" 909 indicating the start of a write operation is at a high level, the scoreboard disable controller 900 may compare the "SB_MIN_COUNT" 902 and the "monitored_count" 912 indicating the number of occurrences of adjacent identical data. If the "monitored_count" 912 is less than the "SB_MIN_COUNT" 902, the scoreboard disable controller 900 may increase the "off_threshold_count" 1011 by 1. That is, whenever the "write_start" 909 is 1, the scoreboard disable controller 900 may count a case where the "monitored_count" 912 indicating the number of occurrences of adjacent identical data does not reach the "SB_MIN_COUNT" 902 that is the specified value of the minimum number. Here, the "monitored_count" 912 is initialized to 0 when the "write_start" 909 is 1. Until the "write_start" 909 becomes 1 again, the "monitored_count" 912 may increase every time the adjacent identical data is generated.

In an example, when the "write_start" 909 is at a high level and the "off_threshold_count" 1011 is equal to or greater than the "SB_LIN_OFF_THRESHOLD" 904, the scoreboard disable controller 900 may output (see reference numeral 1111) the scoreboard write operation enable signal "sb_write_op_enable" 923 at a low level in order to disable the scoreboard. Then, when the "read_start" 910 is at a high level, the scoreboard disable controller 900 may output (see reference numeral 1121) the scoreboard read operation enable signal "sb_read_op_enable" 921 at a low level.

Figure 12A:
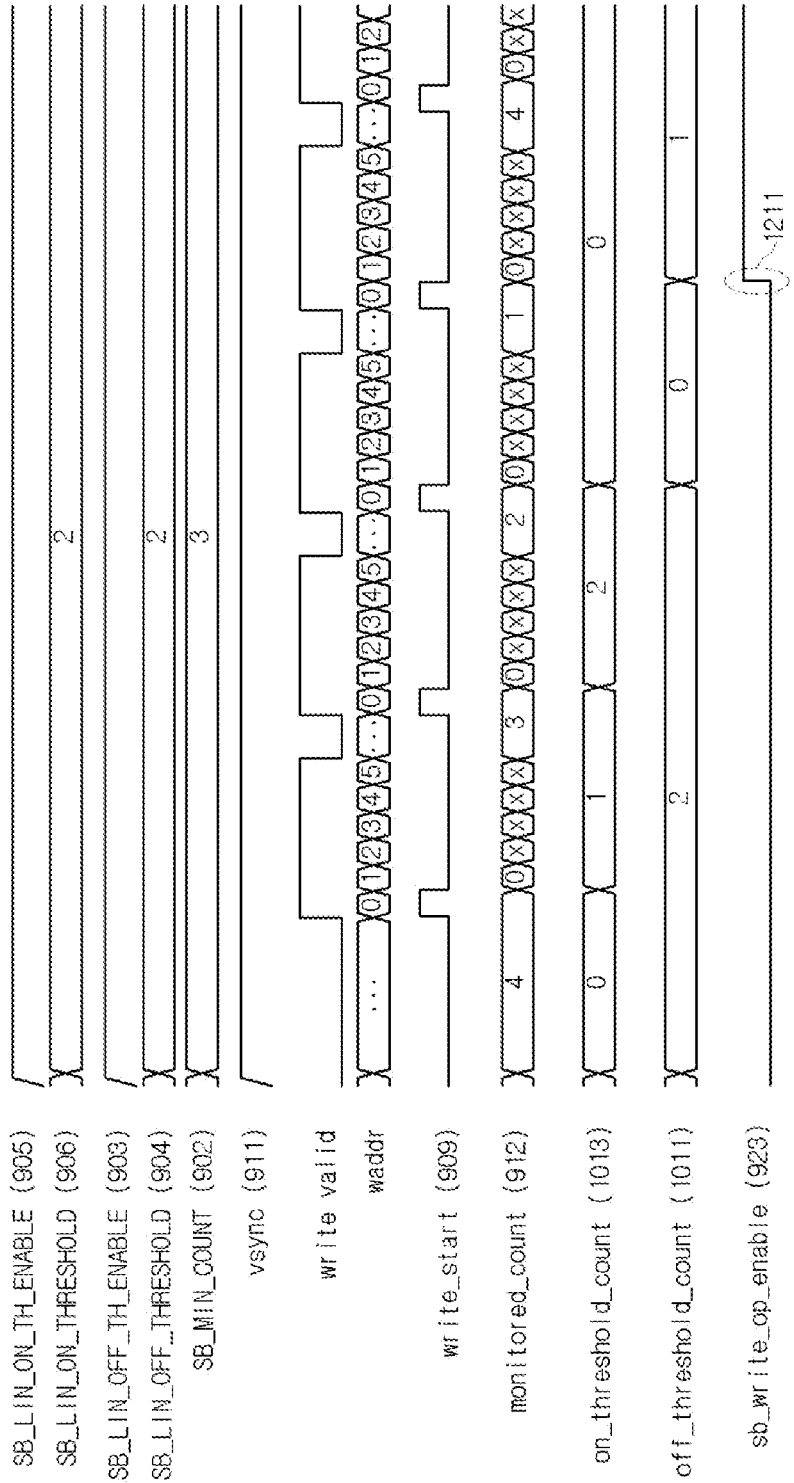
FIGS. 12A and 12B illustrate signal timing diagrams showing that the enable state of the scoreboard is controlled according to one or more embodiments of the present disclosure.
Figure 12B:
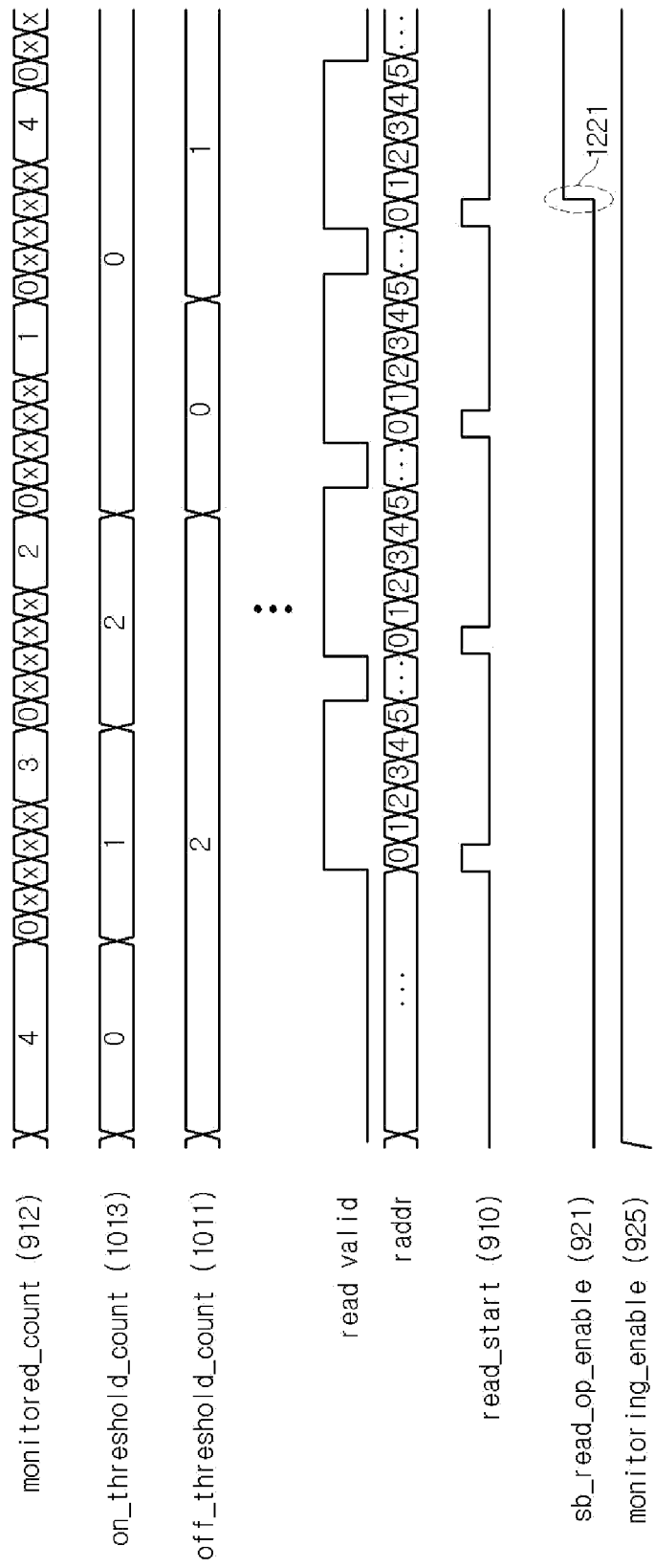

FIGS. 12A and 12B illustrate signal timing diagrams showing that the enable state of the scoreboard 129 may be controlled according to one or more embodiments of the present disclosure.

In FIGS. 12A and 12B, it is assumed that the "SB_LIN_ON_TH_ENABLE" 905 is a high level, the "SB_LIN_OFF_TH_ENABLE" 903 is a high level, the "SB_LIN_ON_THRESHOLD" 906 is "2", the "SB_LIN_OFF_THRESHOLD" 904 is "2", and the "SB_MIN_COUNT" 902 is "3".

Since the "SB_LIN_OFF_TH_ENABLE" 903 and the "SB_LIN_ON_TH_ENABLE" 905 are at a high level, when the "write_start" 909 is at a high level in the state where the scoreboard is disabled, the scoreboard disable controller 900 may compare the "monitored_count" 912 and the "SB_MIN_COUNT" 902. In an example, when the "monitored_count" 912 is greater than or equal to the "SB_MIN_COUNT" 902 in the state where the scoreboard is disabled, the scoreboard disable controller 900 may increase the "on_threshold_count" 1013 by 1. That is, whenever the "write_start" 909 is 1, the scoreboard disable controller 900 may count a case where the "monitored_count" 912 indicating the number of occurrences of adjacent identical data is equal to or greater than the "SB_MIN_COUNT" 902 that is the specified value of the minimum number. Here, the "monitored_count" 912 is initialized to 0 when the "write_start" 909 is 1. Until the "write_start" 909 becomes 1 again, the "monitored_count" 912 may increase every time the adjacent identical data is generated.

In an example, when the "write_start" 909 is at a high level in the state where the scoreboard is disabled, if the "on_threshold_count" 1013 is equal to or greater than the "SB_LIN_ON_THRESHOLD" 906, the scoreboard disable controller 900 may initialize the "on_threshold_count" 1013 and the "off_threshold_count" 1011 to 0. Then, when the "write_start" 909 is at a high level in order to enable the scoreboard, the scoreboard disable controller 900 may output (see reference numeral 1211) the scoreboard write operation enable signal "sb_write_op_enable" 923 at a high level, and when the "read_start" 910 is at a high level, the scoreboard disable controller 900 may output (see reference numeral 1221) the scoreboard read operation enable signal "sb_read_op_enable" 921 at a high level.

As described above, the image processing apparatus according to one or more embodiments of the present disclosure may skip the write and/or read operations of the adjacent identical data within the image, so that the number of accesses to a sequential access line buffer may be minimized and dynamic power consumption can be reduced.

In addition, the image processing apparatus according to one or more embodiments of the present disclosure may control the enable state of the scoreboard 129 according to the number of occurrences of the adjacent identical data within the image, thereby reducing the dynamic power consumption due to the generation and storage of the state information when there is a small amount of the adjacent identical data.

Figure 13:
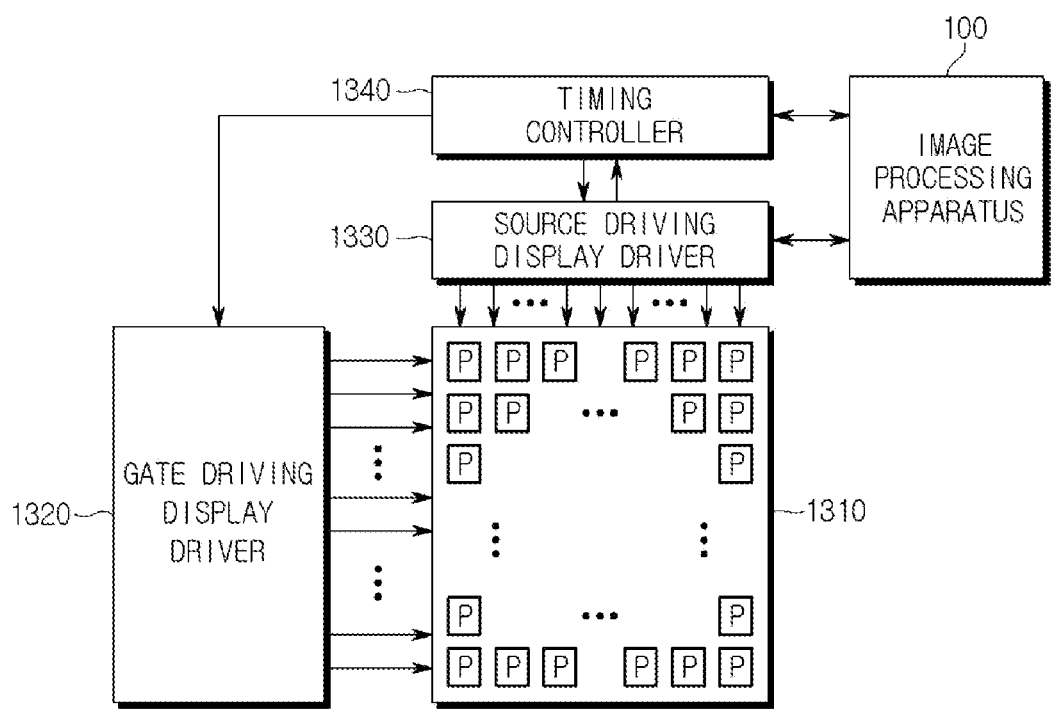
FIG. 13 illustrates a view showing a display device according to one or more embodiments of the present disclosure.

FIG. 13 illustrates a view showing a display device according to one or more embodiments of the present disclosure.

Referring to FIG. 13, the display device according to one or more embodiments of the present disclosure may include a panel 1310, a gate driving display driver 1320, a source driving display driver 1330, a timing controller 1340, and an image processing apparatus 100. Here, the image processing apparatus 100 may be the image processing apparatus 100 of FIG. 1.

In an example, the image processing apparatus 100 may be included within the timing controller 1340.

In an example, the gate driving display driver 1320, the source driving display driver 1330, and the timing controller 1340 may be implemented on one chip and may be commonly designated as a display driver. In an example, the gate driving display driver 1320, the source driving display driver 1330, and the timing controller 1340 may be implemented within one driver IC.

In an example, the panel 1310 may display an image through a pixel array. The pixel array may include red (R), green (G), and blue (B) pixels "P". Each pixel "P" may be composed of a liquid crystal capacitor and a thin film transistor, and the pixels "P" may be arranged in the form of a matrix. Here, a source of the thin film transistor included in each pixel "P" may be connected to a data line driven by the source driving display driver 1330, and a gate of the thin film transistor may be connected to a gate line driven by the gate driving display driver 1320. Each pixel may display an image according to a scan signal applied through the gate line and an analog pixel signal applied through the data line.

The gate driving display driver 1320 may drive the gate lines connected to each pixel "P" of the panel 1310 by the control of the timing controller 1340. In an example, the gate driving display driver 1320 may receive a gate control signal from the timing controller 1340 and may sequentially provide the scan signal to the gate lines.

The source driving display driver 1330 may drive the data lines connected to each pixel "P" of the panel 1310 by the control of the timing controller 1340. In an example, the source driving display driver 1330 may receive a source control signal and image data from the timing controller 1340 and may provide an analog pixel signal to the data lines. Here, the image data may be digital data which is based on M bits and includes a plurality of M bits.

The timing controller 1340 may control driving timing by supplying the gate control signal and the source control signal to the gate driving display driver 1320 and the source driving display driver 1330, respectively, and may obtain the image data from the image processing apparatus 100, and then may supply the image data to the source driving display driver 1330.

According to one or more embodiments of the present disclosure, the image processing apparatus may skip the write and/or read operations of the adjacent identical data within the image, so that the number of accesses to a sequential access line buffer is minimized and dynamic power consumption can be reduced.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image processing apparatus comprising:
a line buffer configured to store image data;
a clock gating circuit configured to apply a clock signal to the line buffer;
a data processor comprising a state information storage and configured to determine, when performing a write operation, whether to skip the write operation to the line buffer for each of adjacent data according to whether a value of each of the adjacent data within an image is the same,
wherein the state information storage is configured to store state information indicating whether the write operation of data at each address is skipped and comprises a scoreboard having the same number of bits as a number of addresses in the line buffer; and
a scoreboard enable controller configured to control an enable state of the scoreboard based on a number of occurrences of adjacent identical data within a range of a specified unit,
wherein the data processor is further configured to control the clock gating circuit, such that the clock signal is not applied to the line buffer while the write operation is skipped and the clock signal is applied to the line buffer while the write operation is performed,
wherein the scoreboard enable controller is configured to:
count the number of occurrences of the adjacent identical data that is less than a required minimum number of the adjacent identical data, when the scoreboard is enabled,
keep the scoreboard enabled, when the counted number is less than a specified first number of acceptable threshold, and
disable the scoreboard, when the counted number is greater than or equal to the specified first number of acceptable threshold.

2. The image processing apparatus of claim 1, wherein, when the value of each of the adjacent data is the same, the data processor is configured to:
perform the write operation to the line buffer for data of a first address among the adjacent data having the same value, and
skip the write operation to the line buffer for data of an address after the first address among the adjacent data having the same value.

3. The image processing apparatus of claim 1, wherein the data processor is configured to:
determine, when performing a read operation, whether to skip the read operation from each address, according to the state information of the data at each address, and
control the clock gating circuit such that the clock signal is not applied to the line buffer while the read operation is skipped and the clock signal is applied to the line buffer while the read operation is performed.

4. The image processing apparatus of claim 3, wherein the data processor is configured to:
skip the read operation from the corresponding address when the state information indicates that the write operation of data of a corresponding address is skipped, and
perform the read operation from the corresponding address when the state information indicates that the write operation of data of a corresponding address is performed.

5. The image processing apparatus of claim 1, wherein state information on the data at each address is stored in each bit of the scoreboard.

6. The image processing apparatus of claim 1, wherein, in a state where the scoreboard is disabled, the scoreboard enable controller is configured to count a case where the number of occurrences of the adjacent identical data is greater than or equal to a required minimum number of the adjacent identical data,
wherein, when the counted value is less than a specified second number of acceptable thresholds, the scoreboard enable controller is configured to maintain the disable state of the scoreboard, and
wherein, when the counted value is greater than or equal to the specified second number of acceptable thresholds, the scoreboard enable controller is configured to enable the scoreboard again.

7. The image processing apparatus of claim 1, wherein, when the counted number is greater than or equal to the specified first number of acceptable thresholds, the scoreboard enable controller is configured to disable the data processor including the scoreboard, and
wherein, when a next image frame begins to be processed, the scoreboard enable controller is configured to enable the data processor.

8. The image processing apparatus of claim 1, wherein, during processing a first image frame, the scoreboard enable controller is configured to count a case where the number of occurrences of the adjacent identical data is less than a required minimum number of the adjacent identical data,
wherein, when a value obtained by counting during processing the first image frame is less than a specified third number of acceptable thresholds, the scoreboard enable controller is configured to enable the scoreboard during processing a second image frame, and
wherein, when the value obtained by counting is greater than or equal to the specified third number of acceptable thresholds, the scoreboard enable controller is configured to disable the scoreboard during processing the second image frame.

9. An operation method of an image processing apparatus comprising a line buffer and a data processor, the operation method comprising:
determining, by the data processor, whether a value of each of adjacent data within an image is the same, when performing a write operation;
determining, by the data processor, whether to skip the write operation to the line buffer for each of the adjacent data, according to whether the value of each of the adjacent data is the same;
controlling, by the data processor, a clock gating circuit configured to apply a clock signal to the line buffer, according to the determination of whether to skip the write operation;
storing, by a state information storage, state information indicating whether the write operation of data at each address is skipped, wherein the state information on the data at each address is stored in a scoreboard having the same number of bits as a number of addresses in the line buffer;
controlling, by a scoreboard enable controller, an enable state of the scoreboard based on a number of occurrences of adjacent identical data within a range of a specified unit,
wherein the controlling of the enable state of the scoreboard comprises:
counting the number of occurrences of the adjacent identical data that is less than a required minimum number of the adjacent identical data, when the scoreboard is enabled;
keeping the scoreboard enabled, when the counted number is less than a specified first number of acceptable threshold; and
disabling the scoreboard, when the counted number is greater than or equal to the specified first number of acceptable threshold.

10. The operation method of claim 9, wherein, when the value of each of the adjacent data is the same, the determining of whether to skip the write operation to the line buffer comprises:
determining to perform the write operation to the line buffer for data of a first address among the adjacent data having the same value; and
determining to skip the write operation to the line buffer for data of an address after the first address among the adjacent data having the same value.

11. The operation method of claim 9, further comprising:
determining, when performing a read operation, whether to skip the read operation from each address, according to the state information of the data of each address; and
controlling the clock gating circuit configured to apply the clock signal to the line buffer, according to the determination of whether to skip the read operation.

12. The operation method of claim 11, wherein the determining of whether to skip the read operation from each address comprises:
determining to skip the read operation from a corresponding address when the state information indicates that the write operation for data of the corresponding address is skipped; and
determining to perform the read operation from a corresponding address when the state information indicates that the write operation for data of the corresponding address is performed.

13. The operation method of claim 9, wherein the controlling of the enable state of the scoreboard comprises:
counting a case where the number of occurrences of the adjacent identical data is greater than or equal to a required minimum number of the adjacent identical data, in a state where the scoreboard is disabled;
maintaining the disable state of the scoreboard, when the counted value is less than a specified second number of acceptable thresholds; and
enabling the scoreboard again, when the counted value is greater than or equal to the specified second number of acceptable thresholds.

14. The operation method of claim 9, wherein the disabling of the scoreboard comprises disabling the data processor including the scoreboard, and
wherein the data processor is configured to be enabled when a next image frame begins to be processed.

15. The operation method of claim 9, wherein the controlling of the enable state of the scoreboard comprises:
- counting a case where the number of occurrences of the adjacent identical data is less than a required minimum number of the adjacent identical data, during processing a first image frame;
- enabling the scoreboard during processing a second image frame, when a value obtained by counting during processing the first image frame is less than a specified third number of acceptable thresholds; and
- disabling the scoreboard during processing the second image frame, when the value obtained by counting is greater than or equal to the specified third number of acceptable thresholds.

* * * * *